(12) United States Patent
Chanda

(10) Patent No.: US 11,956,289 B2
(45) Date of Patent: Apr. 9, 2024

(54) DIGITAL WORKSPACE SHARING OVER ONE OR MORE DISPLAY CLIENTS IN PROXIMITY OF A MAIN CLIENT

(71) Applicant: Haworth, Inc., Holland, MI (US)

(72) Inventor: Rupen Chanda, Austin, TX (US)

(73) Assignee: Haworth, Inc., Holland, MI (US)

( * ) Notice: Subject to any disclaimer, the term of this patent is extended or adjusted under 35 U.S.C. 154(b) by 0 days.

(21) Appl. No.: 18/222,900

(22) Filed: Jul. 17, 2023

(65) Prior Publication Data

US 2023/0362217 A1 Nov. 9, 2023

Related U.S. Application Data

(63) Continuation of application No. 17/563,611, filed on Dec. 28, 2021, now Pat. No. 11,750,672, which is a
(Continued)

(51) Int. Cl.
*H04L 65/403* (2022.01)
*H04L 61/45* (2022.01)
(Continued)

(52) U.S. Cl.
CPC ............ *H04L 65/403* (2013.01); *H04L 61/45* (2022.05); *H04L 65/1069* (2013.01); *H04L 65/401* (2022.05)

(58) Field of Classification Search
CPC .... H04L 65/403; H04L 61/45; H04L 65/1069
See application file for complete search history.

(56) References Cited

U.S. PATENT DOCUMENTS

| 4,686,332 A | 8/1987 | Greanias et al. |
| 5,008,853 A | 4/1991 | Bly et al. |

(Continued)

FOREIGN PATENT DOCUMENTS

| AU | 2014275495 B2 | 12/2015 |
| CN | 1365460 A | 8/2002 |

(Continued)

OTHER PUBLICATIONS

"Ergonomics Data and Mounting Heights," Ergonomic Ground Rules, last revised Sep. 22, 2010, 2 pgs.
(Continued)

*Primary Examiner* — Kristie D Shingles
(74) *Attorney, Agent, or Firm* — Haynes Beffel & Wolfeld LLP; Andrew L. Dunlap

(57) ABSTRACT

Systems and techniques are provided for a digital collaborative workspace system. The system includes a server network node having a processor and a database accessible thereto. The server network node can include logic to register a first display identification code (DIC) with a first network node, a second DIC with a second network node and a third DIC with a third network node. The server network node can detect an input from a second user identifying the shared workspace and the registered phone number or other identifier of the first user. The server network node can transmit this data to the third network node and in dependence upon receiving a selection of one or more of the first DIC, the second DIC, and the third DIC from the third network node, start a collaboration by sending the shared digital workspace to the network nodes registered with the selected DICs.

20 Claims, 20 Drawing Sheets

Related U.S. Application Data continuation-in-part of application No. 16/869,565, filed on May 7, 2020, now Pat. No. 11,212,127.

(51) Int. Cl.
  *H04L 65/1069*    (2022.01)
  *H04L 65/401*    (2022.01)

(56) References Cited

U.S. PATENT DOCUMENTS

| | | | |
|---|---|---|---|
| 5,220,657 A | 6/1993 | Bly et al. |
| 5,309,555 A | 5/1994 | Akins et al. |
| 5,394,521 A | 2/1995 | Henderson, Jr. et al. |
| 5,446,842 A | 8/1995 | Schaeffer et al. |
| 5,537,526 A | 7/1996 | Anderson et al. |
| 5,563,996 A | 10/1996 | Tchao |
| 5,613,134 A | 3/1997 | Lucus et al. |
| 5,689,628 A | 11/1997 | Robertson |
| 5,727,002 A | 3/1998 | Miller et al. |
| 5,781,732 A | 7/1998 | Adams |
| 5,812,847 A | 9/1998 | Joshi et al. |
| 5,818,425 A | 10/1998 | Want et al. |
| 5,835,713 A | 11/1998 | FitzPatrick et al. |
| 5,872,924 A | 2/1999 | Nakayama et al. |
| 5,938,724 A | 8/1999 | Pommier et al. |
| 5,940,082 A | 8/1999 | Brinegar et al. |
| 6,078,921 A | 6/2000 | Kelley |
| 6,084,584 A | 7/2000 | Nahi et al. |
| 6,128,014 A | 10/2000 | Nakagawa et al. |
| 6,167,433 A | 12/2000 | Maples et al. |
| 6,320,597 B1 | 11/2001 | Ieperen |
| 6,342,906 B1 | 1/2002 | Kumar et al. |
| 6,343,313 B1 | 1/2002 | Salesky et al. |
| 6,518,957 B1 | 2/2003 | Lehtinen et al. |
| 6,564,246 B1 | 5/2003 | Varma et al. |
| 6,710,790 B1 | 3/2004 | Fagioli |
| 6,778,989 B2 | 8/2004 | Bates et al. |
| 6,911,987 B1 | 6/2005 | Mairs et al. |
| 6,930,673 B2 | 8/2005 | Kaye et al. |
| 6,930,679 B2 | 8/2005 | Wu et al. |
| 7,003,728 B2 | 2/2006 | Berque |
| 7,043,529 B1 | 5/2006 | Simonoff |
| 7,100,195 B1 | 8/2006 | Underwood |
| 7,129,934 B2 | 10/2006 | Luman et al. |
| 7,171,448 B1 | 1/2007 | Danielsen et al. |
| 7,356,563 B1 | 4/2008 | Leichtling et al. |
| 7,450,109 B2 | 11/2008 | Halcrow et al. |
| D600,703 S | 9/2009 | LaManna et al. |
| 7,908,325 B1 | 3/2011 | Pabla et al. |
| 8,209,308 B2 | 6/2012 | Rueben et al. |
| D664,562 S | 7/2012 | McCain et al. |
| 8,402,391 B1 | 3/2013 | Doray et al. |
| 8,407,290 B2 | 3/2013 | Abt, Jr. et al. |
| 8,543,929 B1 | 9/2013 | Holloway |
| 8,898,590 B2 | 11/2014 | Okada et al. |
| 8,954,862 B1 | 2/2015 | Mabie et al. |
| 9,201,854 B1 | 12/2015 | Kloiber et al. |
| 9,298,834 B2 | 3/2016 | Kleppner et al. |
| 9,465,434 B2 | 10/2016 | Mason |
| 9,471,192 B2 | 10/2016 | Mason |
| 9,479,548 B2 | 10/2016 | Jensen et al. |
| 9,479,549 B2 | 10/2016 | Pearson |
| 9,607,113 B1 | 3/2017 | Ciolfi et al. |
| 9,727,207 B2 * | 8/2017 | Dunn ................ H04N 9/3102 |
| 10,255,023 B2 | 4/2019 | Liu et al. |
| 10,304,037 B2 | 5/2019 | Foley et al. |
| 10,802,783 B2 | 10/2020 | Santhakumar et al. |
| 11,212,127 B2 | 12/2021 | Chanda et al. |
| 11,262,969 B2 | 3/2022 | Santhakumar et al. |
| 11,481,730 B2 | 10/2022 | Foley et al. |
| 11,750,672 B2 | 9/2023 | Chanda |
| 2002/0062348 A1 | 5/2002 | Maehiro |
| 2003/0020671 A1 | 1/2003 | Santoro et al. |
| 2003/0058227 A1 | 3/2003 | Hara et al. |
| 2004/0060037 A1 | 3/2004 | Damm et al. |
| 2004/0083264 A1 | 4/2004 | Veselov |
| 2004/0093331 A1 | 5/2004 | Garner et al. |
| 2004/0150627 A1 | 8/2004 | Luman et al. |
| 2004/0155871 A1 | 8/2004 | Perski et al. |
| 2004/0174398 A1 | 9/2004 | Luke et al. |
| 2004/0243605 A1 | 12/2004 | Bernstein et al. |
| 2004/0243663 A1 | 12/2004 | Johanson et al. |
| 2005/0060656 A1 | 3/2005 | Martinez et al. |
| 2005/0195216 A1 | 9/2005 | Kramer et al. |
| 2005/0237380 A1 | 10/2005 | Kakii et al. |
| 2005/0262107 A1 | 11/2005 | Bergstraesser et al. |
| 2005/0273700 A1 | 12/2005 | Champion et al. |
| 2006/0012580 A1 | 1/2006 | Perski et al. |
| 2006/0066588 A1 | 3/2006 | Lyon et al. |
| 2006/0195507 A1 | 8/2006 | Baek et al. |
| 2006/0211404 A1 | 9/2006 | Cromp et al. |
| 2006/0220982 A1 | 10/2006 | Ueda |
| 2006/0224427 A1 | 10/2006 | Salmon |
| 2006/0294473 A1 | 12/2006 | Keely et al. |
| 2007/0070066 A1 | 3/2007 | Bakhash |
| 2007/0136685 A1 | 6/2007 | Bhatla et al. |
| 2007/0198744 A1 | 8/2007 | Wensley et al. |
| 2007/0262964 A1 | 11/2007 | Zotov et al. |
| 2008/0114844 A1 | 5/2008 | Sanchez et al. |
| 2008/0143818 A1 | 6/2008 | Ferren et al. |
| 2008/0163053 A1 | 7/2008 | Hwang et al. |
| 2008/0177771 A1 | 7/2008 | Vaughn |
| 2008/0201339 A1 | 8/2008 | McGrew et al. |
| 2008/0207188 A1 | 8/2008 | Ahn et al. |
| 2008/0301101 A1 | 12/2008 | Baratto et al. |
| 2009/0049381 A1 | 2/2009 | Robertson et al. |
| 2009/0089682 A1 | 4/2009 | Baier et al. |
| 2009/0128516 A1 | 5/2009 | Rimon et al. |
| 2009/0153519 A1 | 6/2009 | Suarez Rovere |
| 2009/0160786 A1 | 6/2009 | Finnegan |
| 2009/0174679 A1 | 7/2009 | Westerman |
| 2009/0195518 A1 | 8/2009 | Mattice et al. |
| 2009/0207146 A1 | 8/2009 | Shimasaki et al. |
| 2009/0217177 A1 | 8/2009 | DeGrazia |
| 2009/0234721 A1 | 9/2009 | Bigelow et al. |
| 2009/0251457 A1 | 10/2009 | Walker et al. |
| 2009/0278806 A1 | 11/2009 | Duarte et al. |
| 2009/0282359 A1 | 11/2009 | Saul et al. |
| 2009/0309846 A1 | 12/2009 | Trachtenberg et al. |
| 2009/0309853 A1 | 12/2009 | Hildebrandt et al. |
| 2010/0011316 A1 | 1/2010 | Sar et al. |
| 2010/0017727 A1 | 1/2010 | Offer et al. |
| 2010/0073454 A1 | 3/2010 | Lovhaugen et al. |
| 2010/0132034 A1 | 5/2010 | Pearce et al. |
| 2010/0192091 A1 | 7/2010 | Oishi et al. |
| 2010/0194701 A1 | 8/2010 | Hill |
| 2010/0205190 A1 | 8/2010 | Morris et al. |
| 2010/0211920 A1 | 8/2010 | Westerman et al. |
| 2010/0306650 A1 | 12/2010 | Oh et al. |
| 2010/0306696 A1 | 12/2010 | Groth et al. |
| 2010/0309148 A1 | 12/2010 | Fleizach et al. |
| 2010/0315481 A1 | 12/2010 | Wijngaarden et al. |
| 2010/0318470 A1 | 12/2010 | Meinel et al. |
| 2010/0318921 A1 | 12/2010 | Trachtenberg et al. |
| 2010/0328306 A1 | 12/2010 | Chau et al. |
| 2011/0047505 A1 | 2/2011 | Fillion et al. |
| 2011/0050640 A1 | 3/2011 | Lundback et al. |
| 2011/0055773 A1 | 3/2011 | Agarawala et al. |
| 2011/0060992 A1 | 3/2011 | Jevons et al. |
| 2011/0063191 A1 | 3/2011 | Leung et al. |
| 2011/0069184 A1 | 3/2011 | Go |
| 2011/0109526 A1 | 5/2011 | Bauza et al. |
| 2011/0148926 A1 | 6/2011 | Koo et al. |
| 2011/0154192 A1 | 6/2011 | Yang et al. |
| 2011/0183654 A1 | 7/2011 | Lanier et al. |
| 2011/0185406 A1 | 7/2011 | Hirson et al. |
| 2011/0191343 A1 | 8/2011 | Heaton et al. |
| 2011/0197147 A1 | 8/2011 | Fai |
| 2011/0197157 A1 | 8/2011 | Hoffman et al. |
| 2011/0197263 A1 | 8/2011 | Stinson, III |
| 2011/0202424 A1 | 8/2011 | Chun et al. |
| 2011/0208807 A1 | 8/2011 | Shaffer |
| 2011/0214063 A1 | 9/2011 | Saul |
| 2011/0216064 A1 | 9/2011 | Dahl et al. |

(56) References Cited

U.S. PATENT DOCUMENTS

| | | |
|---|---|---|
| 2011/0225494 A1 | 9/2011 | Shmuylovich et al. |
| 2011/0243380 A1 | 10/2011 | Forutanpour et al. |
| 2011/0246875 A1 | 10/2011 | Parker et al. |
| 2011/0264785 A1 | 10/2011 | Newman et al. |
| 2011/0271229 A1 | 11/2011 | Yu |
| 2012/0011465 A1 | 1/2012 | Rezende |
| 2012/0019452 A1 | 1/2012 | Westerman |
| 2012/0026200 A1 | 2/2012 | Okada et al. |
| 2012/0030193 A1 | 2/2012 | Richberg et al. |
| 2012/0038572 A1 | 2/2012 | Kim et al. |
| 2012/0050197 A1 | 3/2012 | Kemmochi |
| 2012/0075212 A1 | 3/2012 | Park et al. |
| 2012/0124124 A1 | 5/2012 | Beaty et al. |
| 2012/0127126 A1 | 5/2012 | Mattice et al. |
| 2012/0169772 A1 | 7/2012 | Werner et al. |
| 2012/0176328 A1 | 7/2012 | Brown et al. |
| 2012/0179994 A1 | 7/2012 | Knowlton et al. |
| 2012/0229425 A1 | 9/2012 | Barrus et al. |
| 2012/0254858 A1 | 10/2012 | Moyers et al. |
| 2012/0260176 A1 | 10/2012 | Sehrer |
| 2012/0274583 A1 | 11/2012 | Haggerty |
| 2012/0275683 A1 | 11/2012 | Adler et al. |
| 2012/0278738 A1 | 11/2012 | Kruse et al. |
| 2012/0320073 A1 | 12/2012 | Mason |
| 2013/0004069 A1 | 1/2013 | Hawkins et al. |
| 2013/0027404 A1 | 1/2013 | Sarnoff |
| 2013/0047093 A1 | 2/2013 | Reuschel et al. |
| 2013/0086487 A1 | 4/2013 | Findlay et al. |
| 2013/0093695 A1 | 4/2013 | Davidson |
| 2013/0106987 A1 | 5/2013 | Wang et al. |
| 2013/0198653 A1 | 8/2013 | Tse et al. |
| 2013/0218998 A1 | 8/2013 | Fischer et al. |
| 2013/0222371 A1 | 8/2013 | Reitan |
| 2013/0246969 A1 | 9/2013 | Barton |
| 2013/0282820 A1 | 10/2013 | Jabri et al. |
| 2013/0320073 A1 | 12/2013 | Yokoo et al. |
| 2013/0346878 A1 | 12/2013 | Mason |
| 2013/0346910 A1 | 12/2013 | Mason |
| 2014/0013234 A1 | 1/2014 | Beveridge et al. |
| 2014/0022334 A1 | 1/2014 | Lockhart et al. |
| 2014/0032770 A1 | 1/2014 | Pegg |
| 2014/0033067 A1 | 1/2014 | Pittenger et al. |
| 2014/0040767 A1 | 2/2014 | Bolia |
| 2014/0040780 A1 | 2/2014 | Artzt et al. |
| 2014/0055400 A1 | 2/2014 | Reuschel |
| 2014/0062957 A1 | 3/2014 | Perski et al. |
| 2014/0063174 A1 | 3/2014 | Junuzovic et al. |
| 2014/0101122 A1 | 4/2014 | Oren |
| 2014/0149880 A1 | 5/2014 | Farouki |
| 2014/0149901 A1 | 5/2014 | Hunter |
| 2014/0222916 A1 | 8/2014 | Foley et al. |
| 2014/0223334 A1 | 8/2014 | Jensen et al. |
| 2014/0223335 A1 | 8/2014 | Pearson |
| 2014/0282229 A1 | 9/2014 | Laukkanen et al. |
| 2014/0313408 A1 | 10/2014 | Sharma et al. |
| 2014/0325431 A1 | 10/2014 | Vranjes et al. |
| 2014/0380193 A1 | 12/2014 | Coplen et al. |
| 2015/0007040 A1 | 1/2015 | Xu et al. |
| 2015/0007055 A1 | 1/2015 | Lemus et al. |
| 2015/0067521 A1 | 3/2015 | Heo et al. |
| 2015/0084055 A1 | 3/2015 | Nagata et al. |
| 2015/0089452 A1 | 3/2015 | Dorninger |
| 2015/0120834 A1 | 4/2015 | Maheshwari et al. |
| 2015/0153994 A1 | 6/2015 | Ueda et al. |
| 2015/0154521 A1 | 6/2015 | Mu et al. |
| 2015/0170212 A1 | 6/2015 | McGie |
| 2015/0185990 A1 | 7/2015 | Thompson |
| 2015/0195410 A1 | 7/2015 | de Castro et al. |
| 2015/0248384 A1 | 9/2015 | Luo et al. |
| 2015/0279071 A1 | 10/2015 | Xin |
| 2015/0331489 A1 | 11/2015 | Edwardson |
| 2016/0054971 A1 | 2/2016 | Yu et al. |
| 2016/0085381 A1 | 3/2016 | Parker et al. |
| 2016/0133226 A1 | 5/2016 | Park et al. |
| 2016/0142471 A1 | 5/2016 | Tse et al. |
| 2016/0232647 A1 | 8/2016 | Carlos et al. |
| 2016/0328098 A1 | 11/2016 | Santhakumar et al. |
| 2016/0328114 A1 | 11/2016 | Santhakumar et al. |
| 2016/0378291 A1 | 12/2016 | Pokrzywka |
| 2017/0090852 A1 | 3/2017 | Harada |
| 2017/0149873 A1 | 5/2017 | Jang et al. |
| 2017/0196037 A1* | 7/2017 | Piqueras Jover ..... H04L 67/146 |
| 2017/0235537 A1 | 8/2017 | Liu et al. |
| 2017/0293458 A1 | 10/2017 | Poel et al. |
| 2017/0315767 A1 | 11/2017 | Rao |
| 2017/0330150 A1 | 11/2017 | Foley et al. |
| 2018/0082264 A1 | 3/2018 | Szeto et al. |
| 2018/0084418 A1 | 3/2018 | Walsh |
| 2020/0348898 A1 | 11/2020 | Son |

FOREIGN PATENT DOCUMENTS

| | | |
|---|---|---|
| CN | 101441539 A | 5/2009 |
| CN | 101630240 A | 1/2010 |
| CN | 103023961 A | 4/2013 |
| CN | 103229141 A | 7/2013 |
| CN | 104395883 A | 3/2015 |
| CN | 104412257 A | 3/2015 |
| JP | 2002116996 A | 4/2002 |
| JP | 2005258877 A | 9/2005 |
| JP | 2010079834 A | 4/2010 |
| JP | 2010129093 A | 6/2010 |
| JP | 2010134897 A | 6/2010 |
| JP | 2010165178 A | 7/2010 |
| JP | 2010218313 A | 9/2010 |
| JP | 2012043251 A | 3/2012 |
| JP | 2016012252 A | 1/2016 |
| KR | 1020090085068 A | 8/2009 |
| WO | 0161633 A2 | 8/2001 |
| WO | 2008063833 A1 | 5/2008 |
| WO | 2009018314 A2 | 2/2009 |
| WO | 2011029067 A2 | 3/2011 |
| WO | 2011048901 A1 | 4/2011 |
| WO | 2012162411 A1 | 11/2012 |
| WO | 2014023432 A1 | 2/2014 |
| WO | 2014121209 A2 | 8/2014 |

OTHER PUBLICATIONS

Albin, T., "Comfortable Portable Computing: The Ergonomic Equation," Copyright 2008 Ergotron, Inc., 19 pgs.
Anacore, "Anacore Presents Synthesis", InfoComm 2012: Las Vegas, NV, USA, Jun. 9-15, 2012, 2 pages, screen shots taken from http://www.youtube.com/watch?v=FbQ9P1c5aNk (visited Nov. 1, 2013).
Ballagas et al., "Sweep and Point and Shoot: Phonecam-Based Interactions for Large Public Displays", Conference Proceedings of CHI 2005, Apr. 2-7, 2005, Porland, Oregon, USA, ACM, 2 Penn Plaza, Suite 701, New York, NY 10121-0701 USA, Apr. 2, 2005, pp. 1200-1203, XP058168409, DOI: 10.1145/1056808.1056876, ISBN 978-1-59593-002-6.
Keller, Ariane, "The ANA Project, Development of the ANA-Core Software" Masters Thesis, dated Sep. 21, 2007, ETH Zurich, 92 pages.
Rohs, "Real-World Interaction with Camera Phones" In: "ECCV 2016 conference", Jan. 1, 2005 (Jan. 1, 2005), Springer International Publishing, Cham 032548, XP055457399, ISSN: 0302-9743, ISBN: 978-3-642-33485-6, vol. 3598, pp. 74-89, DOI: 10.1007/11526858_7.
Villamor, C., et al., "Touch Gesture Reference Guide", Apr. 15, 2010, retrieved from the internet: http://web.archive.org/web/20100601214053; http://www.lukew.com/touch/TouchGestureGuide.pdf, 7 pages, retrieved on Apr. 10, 2012.
Buszko et al., Decentralized Ad-Hoc Groupware API and Framework for Mobile Collaboration, Proceedings of the 2001 International ACM SIGGROUP Conference on Supporting Group Work, Association for Computing Machinery, dated Sep. 30-Oct. 3, 2001, 10 pages.
Ionescu, Ama, et al., "WorkspaceNavigator: Tools for Capture, Recall and Reuse using Spatial Cues in an Interactive Workspace," 2002, <URL=https://hci.stanford.edu/research/wkspcNavTR.pdf>, 16 p.

(56) References Cited

OTHER PUBLICATIONS

Johanson, Brad et al., "The Event Heap: an Enabling Infrastructure for Interactive Workspaces." 2000 <Url=https://jraphics.stanford.edu/papers/eheap/>, 11 pages.

Screen captures from YouTube video clip entitled "Enable Drag-and-Drop Between TreeView," 7 pages, uploaded on Oct. 27, 2010 by user "Intersoft Solutions". Retrieved from Internet: <https :l/www.youtube.com/watch?v=guoj1AnKu_s>.

Taylor, Allen G, SQL for Dummies, 7th Edition, published Jul. 5, 2012, 11 pages.

W3C Working Group Note, HTML: The Markup Language (an HTML language reference), http://www.w3.org/TR/html-rnarkup/iframe.html[Aug. 4, 2016 2:01:59 PM], 3 pages.

\* cited by examiner

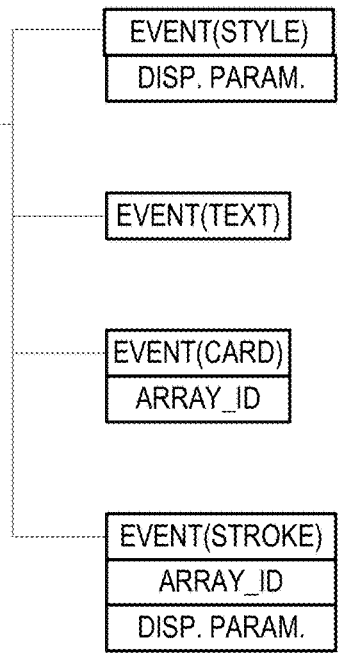
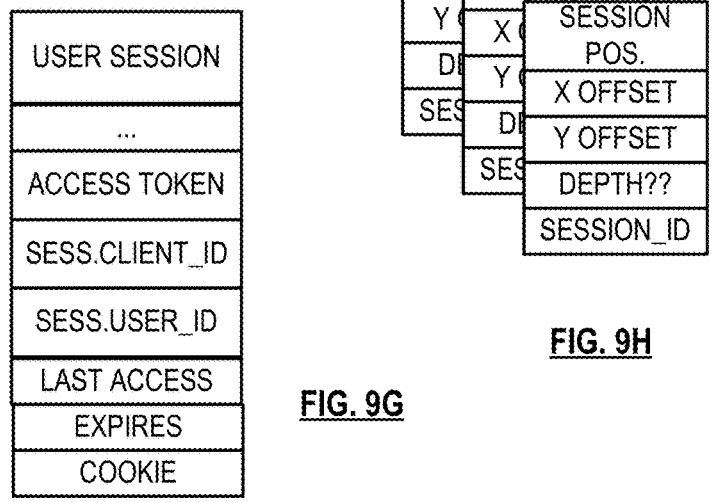
FIG. 9A, FIG. 9B, FIG. 9C, FIG. 9D, FIG. 9E, FIG. 9F, FIG. 9G, FIG. 9H

DIGITAL WORKSPACE SHARING OVER ONE OR MORE DISPLAY CLIENTS IN PROXIMITY OF A MAIN CLIENT

PRIORITY APPLICATION

This application is a continuation of U.S. patent application Ser. No. 17/563,611, filed Dec. 28, 2021 (HAWT 1031-4), which is a continuation-in-part of U.S. patent application Ser. No. 16/869,565, filed May 7, 2020 (HAWT 1031-1). These priority applications are incorporated herein by reference, as if fully set forth herein.

INCORPORATION BY REFERENCE

This application incorporates by reference, U.S. Pat. No. 9,479,548 entitled "COLLABORATION SYSTEM WITH WHITEBOARD ACCESS TO GLOBAL COLLABORATION DATA" and issued on Oct. 25, 2016.

BACKGROUND

Field

The present invention relates to collaboration systems that enable users to participate in collaboration meetings from multiple locations. More specifically, the present invention relates to using display identification codes to start a collaboration between two or more network nodes.

Description of Related Art

Collaboration systems are used in a variety of environments to allow users to contribute and participate in content generation and review. Users of collaboration systems can join collaboration meetings (or simply referred to as collaborations) from locations around the world. The collaboration systems authorize users to access shared digital content on their respective computing devices or digital display walls. It can take a considerable amount of useful meeting time to authenticate users participating in the meeting and then to provide shared digital content to their respective computing devices. For example, some participants such as guests or visitors to an office facility, or even regular users, may not readily have login credentials to access, share or collaborate using the shared content. It becomes difficult to share digital content with such users. Additionally, a challenge arises with respect to maintaining security of shared digital content across users. Another challenge in collaboration systems is efficient utilization and scheduling of digital display resources such as digital display walls, desktop and laptop computers, tablets, and mobile computing devices such as mobile phones. For example, an unscheduled user who is not a registered participant in a scheduled meeting may access and use a digital display wall in a meeting room that was actually scheduled for a meeting. This can waste useful meeting time as users of the scheduled meeting have to request the unscheduled user of the digital display wall and meeting room to log out and remove their content from the digital display wall in the meeting room.

It is desirable to provide a system that can more effectively and automatically manage user authorization, content sharing, and access to digital display walls in a collaboration system so that shared digital content (e.g., a shared digital workspace) is efficiently distributed to meeting participants and only participants of a meeting can access digital display walls during a scheduled meeting.

SUMMARY

A system and method for operating a system are provided for sharing digital content in a collaboration meeting (or a collaboration). Technology is provided to authenticate users and distribute digital content to one or more locations across the world where participants of a collaboration can create and review content. In one aspect, display identification codes can be associated with digital display devices such as digital display walls, desktop or laptop computers, tablets or mobile phones. The display identification codes can be used to send content to hardware devices. In another aspect, the mobile phone numbers of users can be associated to display identification codes thus allowing sending of digital content to digital display clients using mobile phone numbers.

A first implementation of the system (also referred to as digital collaborative workspace system) includes a network node having a communication module, a processor, and a database accessible thereto. The database stores a shared digital workspace. The network node includes logic to send (i) a first display identification code (DIC) to a first network node for display of the first DIC and (ii) a second DIC to a second network node for display of the second DIC. The system includes logic to detect an input from a user, via the communication module, identifying (i) the shared digital workspace, (ii) a first requested DIC and (iii) a second requested DIC. The system starts a collaboration by sending data of the shared digital workspace to both the first network node and the second network node.

A second implementation of the system (also referred to as digital collaborative workspace system) includes a network node having a communication module, a processor, and a database accessible thereto. The database can store a shared digital workspace. The system includes a smart dongle connected to a first network node and communicably connected to the communication module of the network node. The smart dongle includes logic to provide a first display identification code (DIC) to first network node for display of the first DIC. The network node further includes logic, executable by the processor to send a second DIC to a second network node for display of the second DIC. The system can detect an input from a user, via the communication module, identifying (i) the shared digital workspace, (ii) a first requested DIC and (iii) a second requested DIC. The system can start a collaboration by initiating a sending of data of the shared digital workspace to the first network node via the smart dongle and sending the data of the shared digital workspace to the second network node.

Methods and computer program products which can be executed by computer systems are also described herein.

Other aspects and advantages of the present invention can be seen on review of the drawings, the detailed description and the claims, which follow.

BRIEF DESCRIPTION OF THE DRAWINGS

The invention will be described with respect to specific embodiments thereof, and reference will be made to the drawings, which are not drawn to scale, and in which:

FIGS. 9A, 9B, 9C, 9D, 9E, 9F, 9G and 9H (collectively FIG. 9) are simplified diagrams of data structures for parts of the workspace and display mappings data.

DETAILED DESCRIPTION

A detailed description of embodiments of the present invention is provided with reference to the FIGS. 1-13.

The following description is presented to enable any person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

We describe a collaboration environment in which users can participate in an interactive collaboration from the same meeting room or from locations across the world. A participant can join and participate in the collaboration using large format digital displays, desktop and laptop computers, tablets, or mobile computing devices. Following the description of this example collaboration environment, we explain how the technology disclosed addresses the problem of authenticating a user by (i) providing access to and a download of some or all of a shared digital workspace (also referred to as a workspace or a digital asset) by one or more hardware devices such as digital display clients or other computing devices and (ii) providing a user with the ability to access and/or share a workspace and/or participate in a collaboration on their own device (e.g., a handheld tablet) while, for example, the collaboration is active on other devices as well (e.g., a display wall in a meeting room). We present details of the technology disclosed to authenticate a user to access the workspace, authorize the authenticated user to download some or all of the workspace to one or more hardware devices and provide the user with access to a collaboration (e.g., a shared workspace) currently being performed on other devices. We then present description of various elements of the technology disclosed to enable the reader to understand features of these elements. The details of the technology disclosed are illustrated using examples of collaboration workspaces.

Figure 1A:
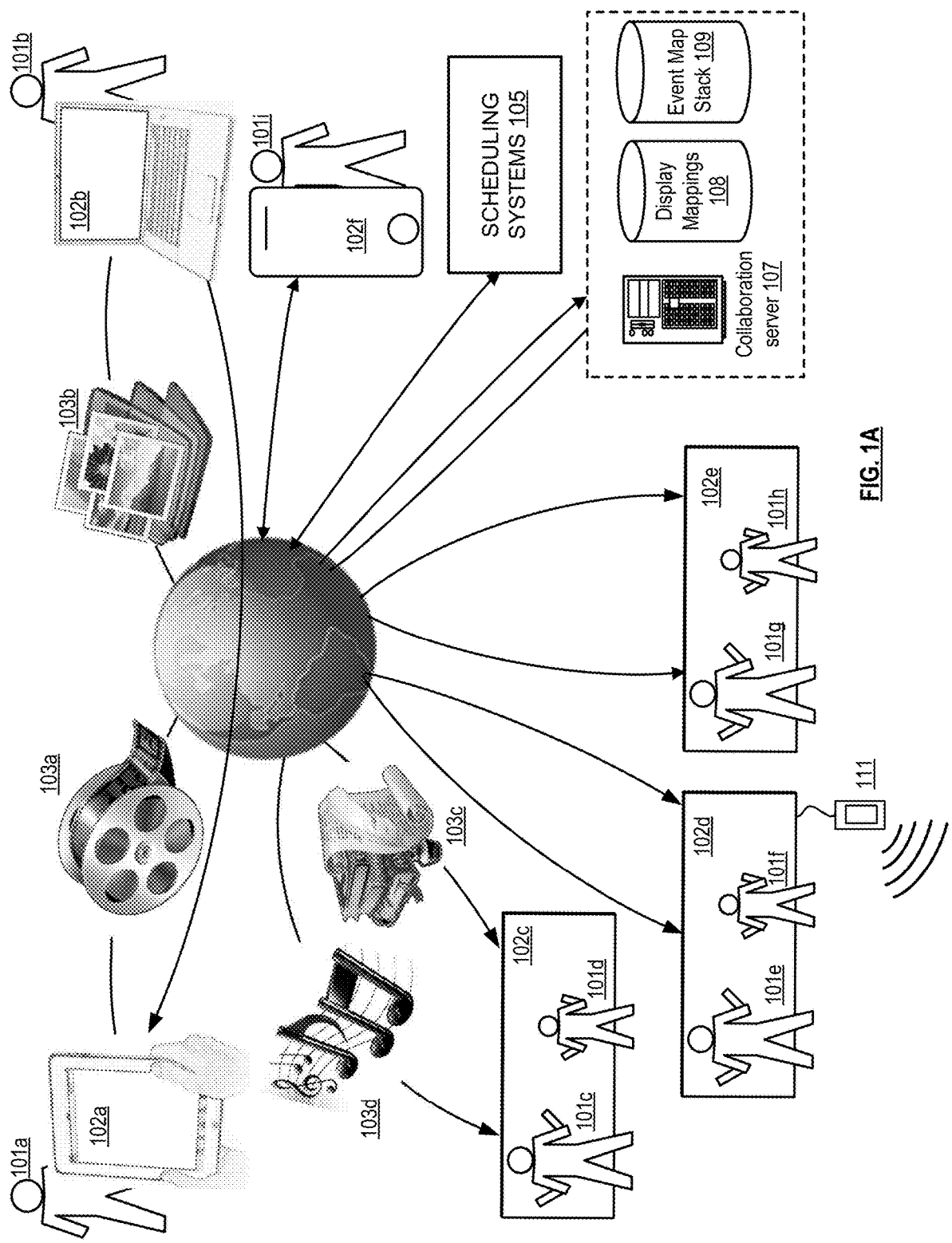
FIGS. 1A and 1B (collectively FIG. 1) illustrate example aspects of a digital collaborative workspace system also referred to as digital display collaboration system or a collaboration system.

FIG. 1A illustrates example aspects of a digital collaborative workspace system also referred to as digital collaboration system or a collaboration environment. In the example, a plurality of users 101a-i (collectively 101), may desire to collaborate with each other in the creation of complex images, music, video, documents, and/or other media, all generally designated in FIG. 1A as 103a-d (collectively 103). The users in the illustrated example use a variety of devices configured as electronic network nodes, in order to collaborate with each other, for example a tablet 102a, a personal computer (PC) 102b, a mobile computing device (e.g., a mobile phone) 102f and many large format displays 102c, 102d, 102e (collectively devices 102). The electronic network nodes can be positioned in locations around the world. In the illustrated example, the large format displays 102c, 102d, and 102e which are sometimes referred to herein as a "wall", accommodate more than one user, (e.g., users 101c and 101d, users 101e and 101f, and users 101g and 101h). The user devices, which are referred to as client-side network nodes, have displays on which a displayable area is allocated for displaying events in a workspace. The displayable area for a given user may comprise the entire screen of the display, a subset of the screen, a window to be displayed on the screen and so on, such that each has a limited area or extent compared to the virtually unlimited extent of the workspace.

The collaboration environment can also include scheduling systems 105 connected through the network. Users can schedule collaboration meetings using a meeting scheduling system such as Microsoft Outlook™, Google Calendar™ etc. Using a meeting scheduling system, a meeting owner (a user who sets up the meeting) can send invites to other users to participate in a collaboration meeting. The meeting can also identify one or more meeting rooms for the collaboration and assign other resources for the meeting such as one or more digital displays located in the meeting rooms. The technology disclosed can also use conferencing systems such as Cisco WebEx™, Microsoft Skype™ to allow voice and video communication between the meeting participants. When the meeting starts, the meeting participants can join the collaboration meeting using the devices 102a, 102b, 102c, 102d, 102e, or 102f.

The large format displays 102c, 102d, 102e sometimes referred to herein as "walls," are controlled by respective client-side network nodes, which in turn are in network communication with a central collaboration server configured as a server-side network node. The server-side network node has access to a database 108 storing display mappings and a database 109 storing spatial event stack for one or more workspaces. The display mappings database 108 stores display identification codes (DICs) mapped to digital displays or walls. A display identification code can be an alpha-numeric string of a pre-defined length. A DIC is assigned to one or more digital displays and can be displayed on respective assigned digital displays.

As used herein, a network node is an active electronic device that is attached to a network, and is capable of sending, receiving, or forwarding information over a communications channel. Examples of electronic devices which can be deployed as network nodes, include all varieties of computers, workstations, laptop and desktop computers, handheld computers and smart phones. The digital displays 102*c* and 102*d* are also examples of network nodes. Throughout this document digital displays, display clients, servers, client devices, etc., can simply be referred to as "network nodes", "client-side network nodes" and/or "server-side network nodes." As used herein, the term "database" does not necessarily imply any unity of structure. For example, two or more separate databases, when considered together, still constitute a "database" as that term is used herein.

The digital collaborative workspace system of FIG. 1 can include digital display walls, such as for example digital display wall 102*d*, that do not include a built-in computer processor and/or networking capability. An external computing device 111 (also referred to as a smart dongle, or a dongle) such as Intel™ Compute Stick (Core m3) or Google™ Chromecast can be connected to the digital display 102*d* through a port such as an HDMI port, a USB port, etc. The smart dongle 111 is connected to the digital display client 102*d* and is communicably connected to the communication module of the collaboration server 107. Thus, the digital display 102*d* is also an example of a network node when the smart dongle 111 is connected to it. The collaboration server 107 includes logic to identify the display client 102*d* linked to the server via the smart dongle. The system can include more than one display clients with smart dongles attached to them. The smart dongle 111 can include logic to provide a display identification code (DIC) to the display client for display of the DIC. In one embodiment, the collaboration server sends a display identification code (DIC) to the smart dongle which then sends the received DIC to the display client for display. In another embodiment, the smart dongle generates the DIC and provides the generated DIC to the display client for display. In yet another embodiment, the smart dongle generates the DIC in response to receiving an indication from the collaboration server to the generate the DIC.

The collaboration server can detect an input from a user via the communication module to identify a shared digital workspace (such as a workspace) for which the user is authorized to access. The collaboration server can also detect the input from a user identifying one or more requested display identification codes (DICs). The collaboration server then determines if the requested display identification code (DIC) input by the user matches to the DIC sent to the display client. In response to the match, the collaboration server starts a collaboration by providing access to the display client to shared digital workspace to via the smart dongle 111.

The collaboration workspace technology described above can be used for collaboration in a wide variety of environments. For example, the technology can be used to conduct collaboration meetings in an enterprise environment in which employees of an organization or other groups participate from one or more office locations or remote locations around the world, simultaneously and at different times, by interacting with a collaboration workspace in the same or different virtual locations. Also, the collaboration technology can be used in an educational environment such as to deliver a lecture in one or more lecture theaters and remote locations. The teacher and students can connect to the collaboration meeting using their respective computing devices from one or more lecture theaters or remote locations around the world. The participants in a collaboration meeting can perform a variety of interactive tasks in the workspace. For example, a user can touch a document in the workspace to open that document, annotate on the document that is open in the workspace, or share the document with other users, etc.

It can be imaged that a collaboration can include many participants from locations around the world, therefore, it can take considerable amount of time at the start of the meeting to authenticate all participants and share the workspace with them. In prior art systems, this can include a two-step process. At a first step, a participant enters her login credentials such as a personal identification number (PIN), or even a DIC, to get access to the collaboration server (i.e., the user is authenticated). The second step includes allowing the authenticated participant to download some or all of the workspace to a hardware device such as digital display wall, computer, or a mobile computing device by using an identifier that identifies the hardware device. Thus, prior art systems can require prior authorization of hardware devices to share workspaces. This can limit the ability of the organizer or owner of the collaboration meeting to share content with participants who have not been authenticated by the collaboration server. Such users can include guests attending a meeting or users who have not been sent an invitation prior to the meeting and are attempting to join the collaboration meeting as the meeting starts. The technology disclosed allows a user who is authorized to access the workspace to share the workspace with hardware devices that may not have authorization to access the workspace.

In one embodiment, the technology disclosed can map mobile phone numbers to display identification codes of hardware devices. The authorized user can download the workspace (or a portion of the workspace) on hardware devices by using a mobile phone number to identify the hardware device instead of using a display identification code or any other identifier for hardware device. The technology disclosed allows downloading of workspace to one or more hardware devices by allowing the user to enter the display identification codes of hardware devices simultaneously, thus decreasing the time required to start the meeting by sharing the workspace with meeting participants in one step.

In addition to allowing efficient distribution of workspaces to hardware devices, the technology disclosed can use information collected from meeting scheduling systems to only allow the users who are participants of a meeting to join the collaboration meeting and use hardware resources. For example, when an authenticated user attempts to download a workspace to a digital display wall in a meeting room, the collaboration server 107 allows the user to share or download the workspace to the digital display wall if the user is participant of the current scheduled meeting in the room in which the digital wall is placed. If a user is attempting to download the workspace to the digital display wall before the meeting start time, the system can deny this request and display a message to the user with the meeting time at which she can start using the hardware devices in the meeting room. Additionally, when a meeting is about the end, the system can display a message to the meeting organizer that the meeting is about to end. Therefore, the technology disclosed enables efficient utilization of hardware devices, such as display clients, during the meeting time and provides an efficient one-step process to share or download workspaces (or shared digital workspace) to hardware devices.

An example of a collaboration workspace including a "Spatial Event Map" data structure is referred to for the purposes of description of the technology. The spatial event map contains information to define objects and events in a workspace. The spatial event map can be used to generate an event log or a log of entries which identifies an event comprising data specifying virtual coordinates of location within the workspace at which an interaction with the workspace is detected, data specifying a type of interaction, a graphical object associated with the interaction, and a time of the interaction. It is useful to consider the technology from the point of view of space, events, maps of events in the space, and access to the space by multiple users, including multiple simultaneous users. We now present description of these elements.

Space: In order to support an unlimited amount of spatial information for a given collaboration, we provide a way to organize a virtual space termed the workspace, which can for example be characterized by a 2-dimensional Cartesian plane with essentially unlimited extent in one or both of the dimensions for example, in such a way that new content can be added to the space, that content can be arranged and rearranged in the space, that a user can navigate from one part of the space to another, and that a user can easily find needed things in the space when it is needed.

Events: Interactions with the workspace are handled as events. People, via tangible user interface devices such as touchscreens on digital display walls, desktop and laptop computers, handheld computing devices, cell phones, and other systems can interact with the workspace. The interaction events (or simply referred to as events) described herein include the events that are generated as a result of the interaction of users with the workspace displayed on digital displays (or walls) or computing devices. In the technology disclosed, when a user interacts with a file object displayed on a workspace to open the file or save the file, the system generates an interaction event when user touches the workspace or performs a gesture to interact with the workspace.

Map: A map of events in the workspace can include the sum total of discrete spatial events. When the persistent spatial events for a workspace are available, then that workspace can be "mapped" to a display or screen that has a displayable area of specific size, and that identifies a location or area in the workspace to be displayed in the displayable area.

Multi-User Access: One key characteristic is that all users, or multiple users, who are working on a workspace simultaneously, should be able to see the interactions of the other users in near-real-time way. The spatial event map allows users having displays at different physical locations to experience near-real-time events, including both persistent and ephemeral events, within their respective displayable areas, for all users on any given workspace.

Interaction events have data that can define or point to a target graphical object to be displayed on a physical display, and an action as creation, modification, movement within the workspace and deletion of a target graphical object, and metadata associated with them. Metadata can include information such as originator, date, time, location in the workspace, event type, security information. The location in the workspace can be identified by virtual coordinates of location within the workspace at which an interaction with the workspace occurred. The technology disclosed includes the logic to map the local coordinates of the interaction at a client device to virtual coordinates in the workspace. The events metadata can also include the type of interaction. The system includes the logic to define various types of interactions, for example drawing, writing or annotating on the workspace; adding a digital asset such as a webpage, video, or a document; or moving/arranging objects on the workspace. The event metadata also includes logic to identify digital assets or objects associated with the interaction event. The event metadata can include the name and/or identifier of the organization where the system is deployed. The event metadata can also include the workspace identifier.

The event metadata can include information about the user who performed the event such as the location of the user and whether the user performed the event using a digital display wall, a laptop computer or a handheld device such as a tablet or a cell phone. Events can also be referred to as an activity. The system can also determine whether an event occurred during a multi-user collaboration, i.e., during a meeting in which two or more users participate or a single user collaboration also referred to as a single user collaboration meeting. The above event metadata information can be stored as part of the event metadata (also referred to as log of entries). The system can assign weights to events to identify their relative importance. In one embodiment, an event is assigned the same weight across all workspaces in the organization. In another embodiment, the weights can be assigned according to their importance in a particular department, group or a team within the organization. In yet another embodiment, the weights can be assigned based on the time at which the event occurred. For example, a create event that occurred during a multiuser collaboration meeting is given a higher weight as it represents a higher level of collaboration within the team and a create event that occurred in a single user collaboration meeting is given a lower weight. We now describe a collaboration environment which can use the elements described above to enable collaboration meetings.

Tracking events in a workspace enables the system to not only present the spatial events in a workspace in its current state, but to share it with multiple users on multiple displays, to share relevant external information that may pertain to the content and understand how the spatial data evolves over time. Also, the spatial event map can have a reasonable size in terms of the amount of data needed, while also defining an unbounded workspace.

There can be several different kinds of events in the system. Events can be classified as persistent events, also referred to as history events, that are stored permanently, or for a length of time required by the system for maintaining a workspace during its useful life. Events can be classified as ephemeral events that are useful or of interest for only a short time and shared live among other clients involved in the session. Persistent events may include history events stored in an undo/playback event stream, which event stream can be the same as or derived from the spatial event map of a session. Ephemeral events may include events not stored in an undo/playback event stream for the system. A spatial event map, or maps, can be used by a collaboration system to track the times and locations in the workspace in some embodiments of both persistent and ephemeral events on workspaces in the system.

Figure 1B:
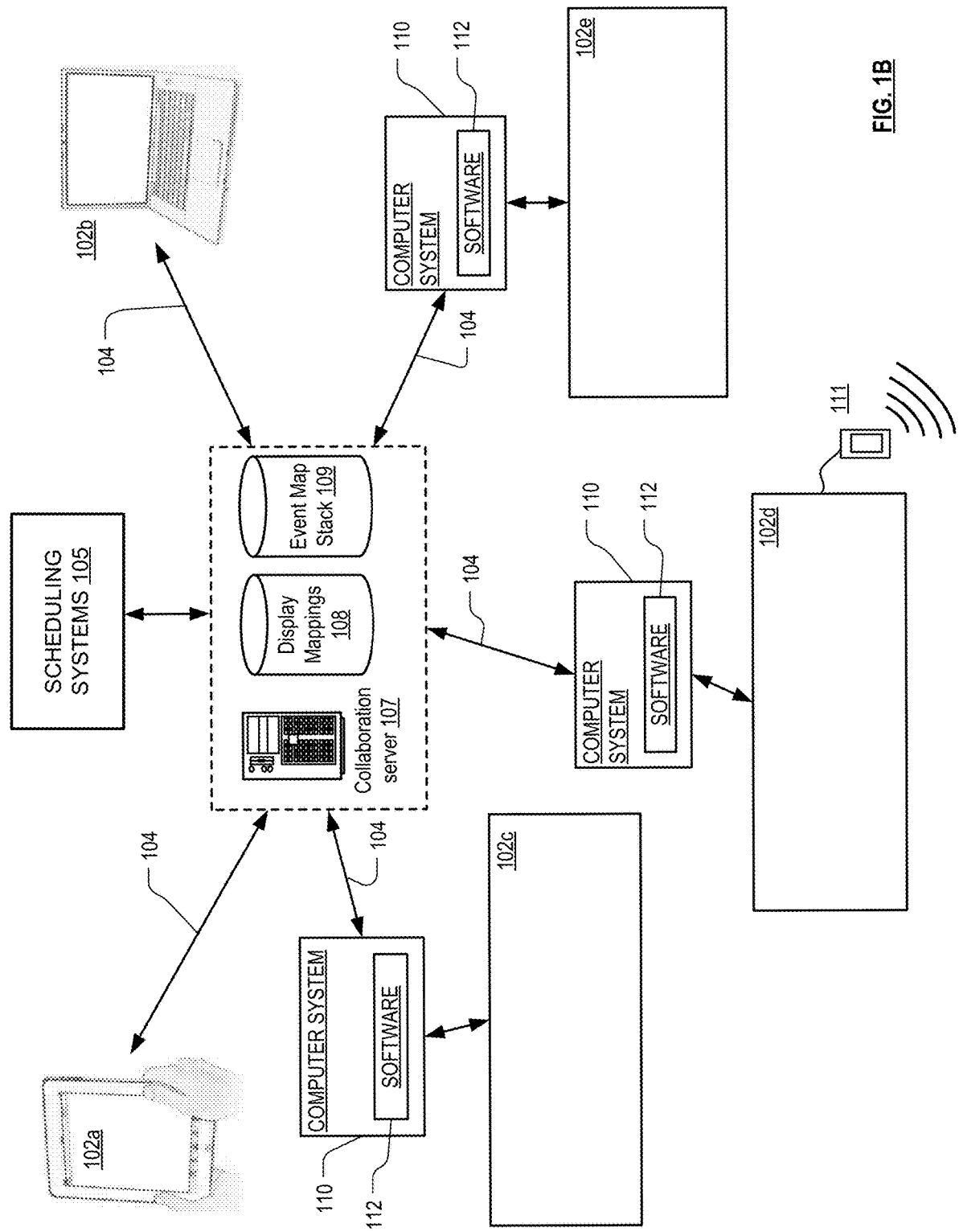

FIG. 1B illustrates the same environment as in FIG. 1A. The application running at the collaboration server 107 can be hosted using Web server software such as Apache or nginx. It can be hosted for example on virtual machines running operating systems such as LINUX. The server 107 is heuristically illustrated in FIG. 1B as a single computer. However, the server architecture can involve systems of many computers, each running server applications, as is typical for large-scale cloud-based services. The server architecture includes a communication module which can be configured for various types of communication channels, including more than one channel for each client in a collaboration. For example, near-real-time updates across the network, client software can communicate with the server communication module via using a message-based channel, based for example on the Web Socket protocol. For file uploads as well as receiving initial large volume workspace data, the client software can communicate with the server communication module via HTTP. The server can run a front-end program written for example in JavaScript and HTML, using Node.js, support authentication/authorization based for example on Oauth, and support coordination among multiple distributed clients. The front-end program can be written using other programming languages and web-application frameworks such as in JavaScript served by Ruby-on-Rails. The server communication module can include a message-based communication protocol stack, such as a Web Socket application, that performs the functions of recording user actions in workspace data, and relaying user actions to other clients as applicable. This system can run on the node.JS platform for example, or on other server technologies designed to handle high-load socket applications.

The display mappings database 108 can be used to store the display identification codes sent to display clients. The display clients can include digital display walls or other hardware devices such as desktop or laptop computers, tablets, mobile phones, or other mobile computing devices. The display mappings database can also store flags for display identification codes indicating whether a display identification code is enabled or disabled. In one embodiment, when the workspace is downloaded to a display client, the display identification code sent to the display client is disabled to prevent another user from starting a collaboration on this display client. At the end of the collaboration meeting, the workspace is removed from the display client. The system then adds the display client in the list of available hardware devices and re-enables the display identification code to allow another user to start another collaboration on this display client. In another embodiment, the system includes, so called one-time display identification codes. In such embodiment, when a display client becomes available, the collaboration server sends a new display identification code (DIC) to the display client for display on the device. The server then updates the display mappings database 108 by including a record that maps the new DIC to the display client. Details of an example technology for one-time identification codes are presented in U.S. Pat. No. 9,479,548, titled, "Collaboration System with Whiteboard Access to Global Collaboration Data", which is incorporated herein by reference as if fully set forth herein.

The technology disclosed can gather the "user" (or a participant) data from scheduling systems 105. In one embodiment, the user information is stored as part of the display mappings database 108. In another embodiment, the user information can be stored as a separate user database. In such an embodiment, the records in the user data database can be linked to the entries in the display mappings database 108 and event map stack database 109. The user data can include information such as name of the user, a user identifier, login credentials, mobile phone number, etc. The collaboration server can use the credentials to identify the user in dependence upon the detected input from the user prior to the start of the collaboration. If the credentials entered by the user match the credentials stored in the user database, the system allows the user to start the collaboration. Otherwise, the system can restrict user's access to the shared digital workspace (also referred to as workspace) in dependence upon authorization information associated with the identity of the user or with the shared digital workspace. The user database can also include users' collaboration history such as the duration for which the user participated in the collaboration, a start time when the user joined the meeting, an end time when the user left the meeting, etc.

The system can also gather users' collaboration data from scheduling systems 105 and use this information to limit access to display clients during scheduled meeting times. The collaboration server can terminate the collaboration at an expiration of a determined duration of time beginning from a time of the start of the collaboration. Examples of scheduling systems 105 include calendar applications such as Microsoft Outlook™, Google Calendar™, etc. The system can collect meeting information from calendar applications indicating a scheduled meeting start time and stop time of the collaboration. The collaboration server determines a duration of the collaboration from the scheduled meeting start and stop time. The collaboration server can then set the duration of time to equal the duration of the collaboration. The collaboration server can prompt the user that the scheduled meeting stop time is approaching on at least one device of a user. In one embodiment, the collaboration server can terminate the collaboration at the end of the scheduled meeting time. In another embodiment, the collaboration server prompts the user to extend the meeting time by moving the meeting stop time to a later time. The system can also include logic to receive an input from one or more users to disable access to the shared digital workspace by one or more of the network nodes.

The database 109 stores, for example, a digital representation of workspace data sets for a spatial event map of each session where the workspace data set can include or identify events related to objects displayable on a display canvas. A workspace data set can be implemented in the form of a spatial event stack, managed so that at least persistent spatial events are added to the stack (push) and removed from the stack (pop) in a first-in-last-out pattern during an undo operation. There can be workspace data sets for many different workspaces. A data set for a given workspace can be configured in a database, or as machine readable document linked to the workspace. The workspace can have unlimited or virtually unlimited dimensions. The workspace data includes event data structures identifying objects displayable by a display client in the display area on a display wall, and associates a time and a location in the workspace with the objects identified by the event data structures. Each device 102 displays only a portion of the overall workspace. A display wall has a display area for displaying objects, the display area being mapped to a corresponding area in the workspace that corresponds to a region in the workspace centered on, or otherwise located with, a user location in the workspace. The mapping of the display area to a corresponding area in the workspace is usable by the display client to identify objects in the workspace data within the display area to be rendered on the display, and to identify objects to which to link user touch inputs at positions in the display area on the display.

The server 107 and databases 108 and 109 can constitute a server-side network node, including memory storing a log of events relating to graphical targets having locations in a workspace, entries in the log of events include a location in the workspace of the graphical target of the event, data identifying a type of interaction event, a time of the event, and a target identifier of the graphical target of the event. Participants or users related data can also be stored in the database 108 or in a separate database connected to the server 107. The server can include logic to establish links to a plurality of active client-side network nodes, to receive messages identifying events relating to modification and creation of graphical targets having locations in the workspace, to add events to the log in response to said messages, and to distribute messages relating to events identified in messages received from a particular client-side network node to other active client-side network nodes.

The logic in the server 107 can comprise an application program interface, including a specified set of procedures and parameters, by which to send messages carrying portions of the log to client-side network nodes, and to receive messages from client-side network nodes carrying data identifying events relating to graphical targets having locations in the workspace. Also, the logic in the server 107 can include an application interface including a process to distribute events received from one client-side network node to other client-side network nodes.

The events compliant with the API can include a first class of event (history event) to be stored in the log and distributed to other client-side network nodes, and a second class of event (ephemeral event) to be distributed to other client-side network nodes but not stored in the log.

The server 107 can store workspace data sets for a plurality of workspaces, and provide the workspace data to the display clients participating in the session. The workspace data is then used by the computer systems 110 with appropriate software 112 including display client software, to determine images to display on the display, and to assign objects for interaction to locations on the display surface. The server 107 can store and maintain a multitude of workspaces, for different collaboration meetings. Each workspace can be associated with a group of users, and configured for access only by authorized users in the group.

In some alternatives, the server 107 can keep track of a "viewport" for each device 102, indicating the portion of the canvas viewable on that device, and can provide to each device 102 data needed to render the viewport.

Application software running on the client device responsible for rendering drawing objects, handling user inputs, and communicating with the server can be based on HTML5 or other markup based procedures, and run in a browser environment. This allows for easy support of many different client operating system environments.

The user interface data stored in database 109 includes various types of objects including graphical constructs, such as image bitmaps, video objects, multi-page documents, scalable vector graphics, and the like. The devices 102 are each in communication with the collaboration server 107 via a network 104. The network 104 can include all forms of networking components, such as LANs, WANs, routers, switches, WiFi components, cellular components, wired and optical components, and the internet. In one scenario two or more of the users 101 are located in the same room, and their devices 102 communicate via WiFi with the collaboration server 107. In another scenario two or more of the users 101 are separated from each other by thousands of miles and their devices 102 communicate with the collaboration server 107 via the internet. The walls 102c, 102d, 102e can be multi-touch devices which not only display images, but also can sense user gestures provided by touching the display surfaces with either a stylus or a part of the body such as one or more fingers. In some embodiments, a wall (e.g., 102c) can distinguish between a touch by one or more fingers (or an entire hand, for example), and a touch by the stylus. In an embodiment, the wall senses touch by emitting infrared light and detecting light received; light reflected from a user's finger has a characteristic which the wall distinguishes from ambient received light. The stylus emits its own infrared light in a manner that the wall can distinguish from both ambient light and light reflected from a user's finger. The wall 102c may, for example, be an array of Model No. MT553UTBL MultiTaction Cells, manufactured by Multi-Touch Ltd, Helsinki, Finland, tiled both vertically and horizontally. In order to provide a variety of expressive means, the wall 102c is operated in such a way that it maintains "state." That is, it may react to a given input differently depending on (among other things) the sequence of inputs. For example, using a toolbar, a user can select any of a number of available brush styles and colors. Once selected, the wall is in a state in which subsequent strokes by the stylus will draw a line using the selected brush style and color.

In an illustrative embodiment, a display array can have a displayable area totaling on the order of 6 feet in height and 30 feet in width, which is wide enough for multiple users to stand at different parts of the wall and manipulate it simultaneously. Flexibility of expression on the wall may be restricted in a multi-user scenario, however, since the wall does not in this embodiment distinguish between fingers of different users, or styli operated by different users. Thus, if one user places the wall into one desired state, then a second user would be restricted to use that same state because the wall does not have a way to recognize that the second user's input is to be treated differently.

In order to avoid this restriction, the client-side network node can define "drawing regions" on the wall 102c. A drawing region, as used herein, is a region within which at least one aspect of the wall's state can be changed independently of other regions on the wall. In the present embodiment, the aspects of state that can differ among drawing regions include the properties of a line drawn on the wall using a stylus. Other aspects of state, such as the response of the system to finger touch behaviors may not be affected by drawing regions.

Figure 2:
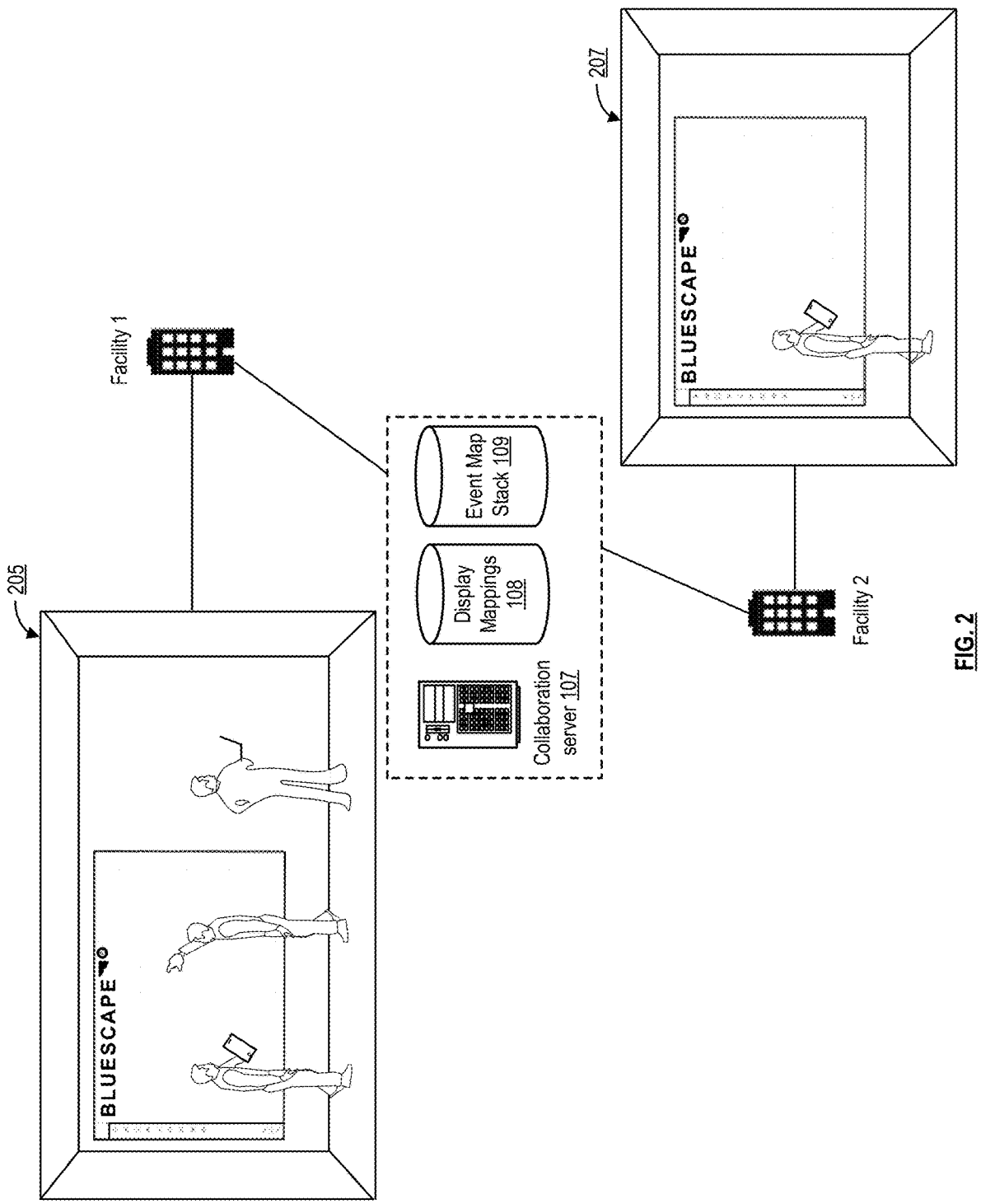
FIG. 2 illustrates a collaboration system including a plurality of geographically distributed display walls to which collaboration data can be delivered for use by authorized users.

We now describe an example in which technology disclosed can be deployed as a distributed collaboration system. FIG. 2 illustrates an example of a distributed collaboration system. The system can include a shared collaboration server 107 which can be linked to a number of facilities (e.g., facility 1 and facility 2) which are geographically distributed, and at which display clients are located. For example, Facility 1 may be located in New York City, while Facility 2 may be located in Los Angeles. There may be many other physical locations at which display clients usable in a collaboration system are located. For example, Facility 1 can include one or more meeting rooms and offices. It can be seen that three users are attending a collaboration meeting in room 205. The workspace can be downloaded on the digital display wall in the meeting room and also on tablet and laptop computers of the users attending the meeting. For illustration purposes, we have shown one room 205 in Facility 1. The room 205 in Facility 1 can include one or more digital display walls. It can also include large-format display that is implemented using a plurality of displays. The other meeting rooms in Facility 1 can include digital display walls or other computing device such as laptop or desktop computers. The users can also join collaboration meeting from their private offices or other rooms in which the personal computer or laptop can be utilized as the display client for a session interacting in a chosen workspace.

Facility 2 in this illustration is like Facility 1. Facility 2 can also include one or more meeting rooms and offices. For illustration purposes we have shown one room 207 in Facility 2 the includes a digital display wall. Facility 2 can also include other meeting rooms and offices. The users can join collaboration meeting from other meeting rooms in Facility 2 or private offices or other rooms in which the personal computer, laptop, tablet mobile computing devices, or mobile phone can be utilized as the display client for a session. One user is seen attending the meeting in the room 207. The workspace can be downloaded on the digital display wall in the room and the tablet device of the user.

Figure 3A:
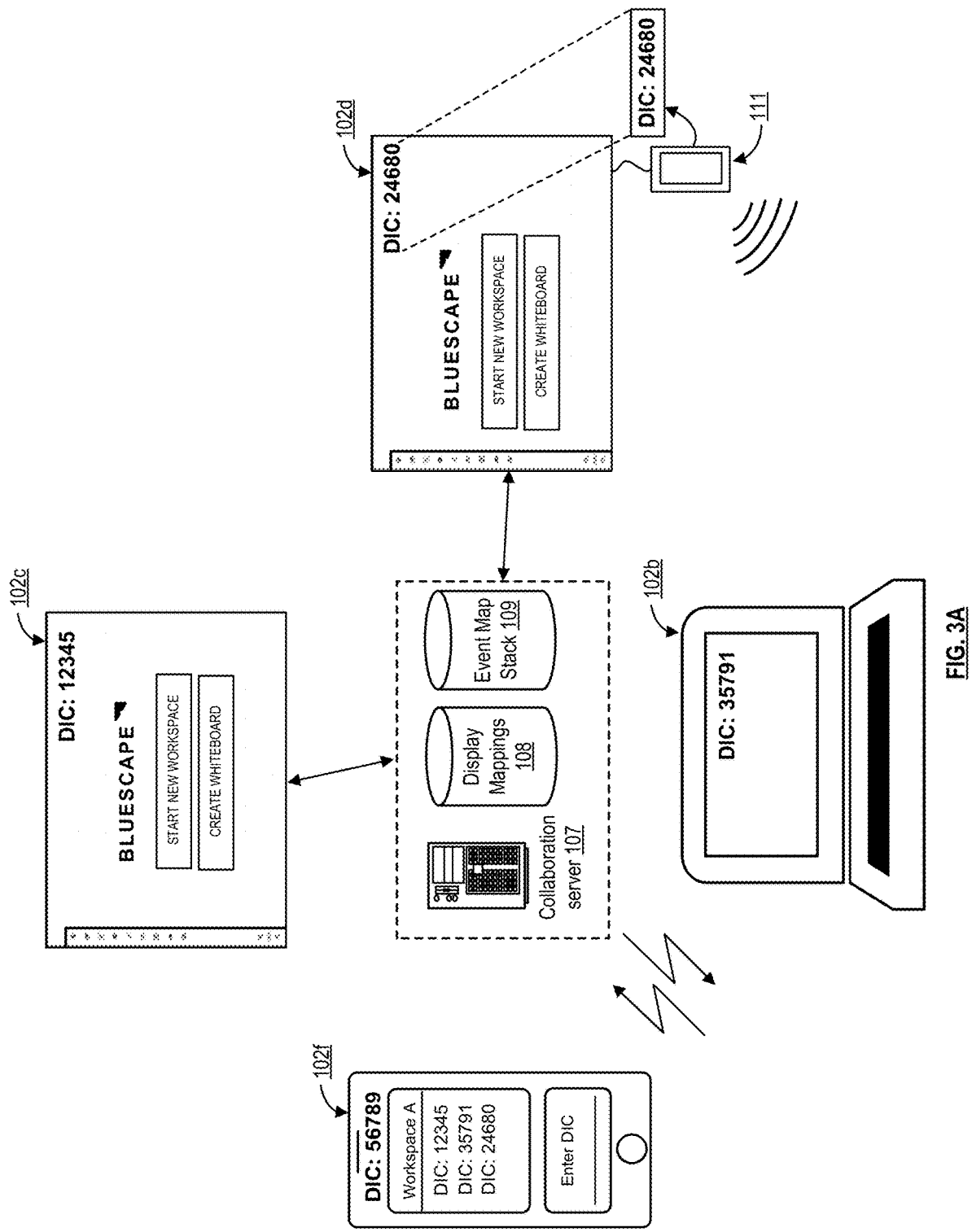
FIGS. 3A and 3B (collectively FIG. 3) illustrate an example of shared digital workspaces sent to multiple display clients using display identification codes.
Figure 3B:
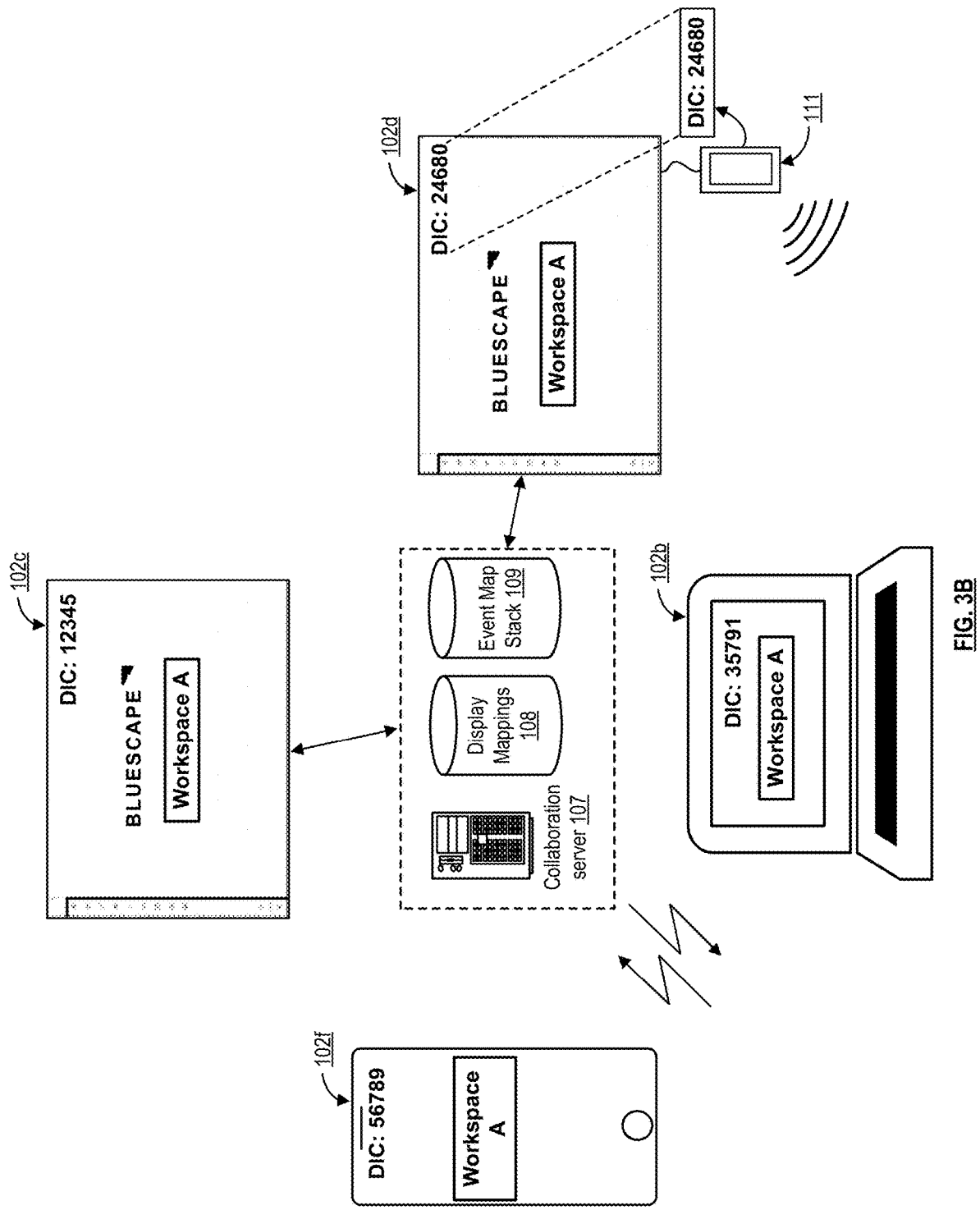
Figure 4A:
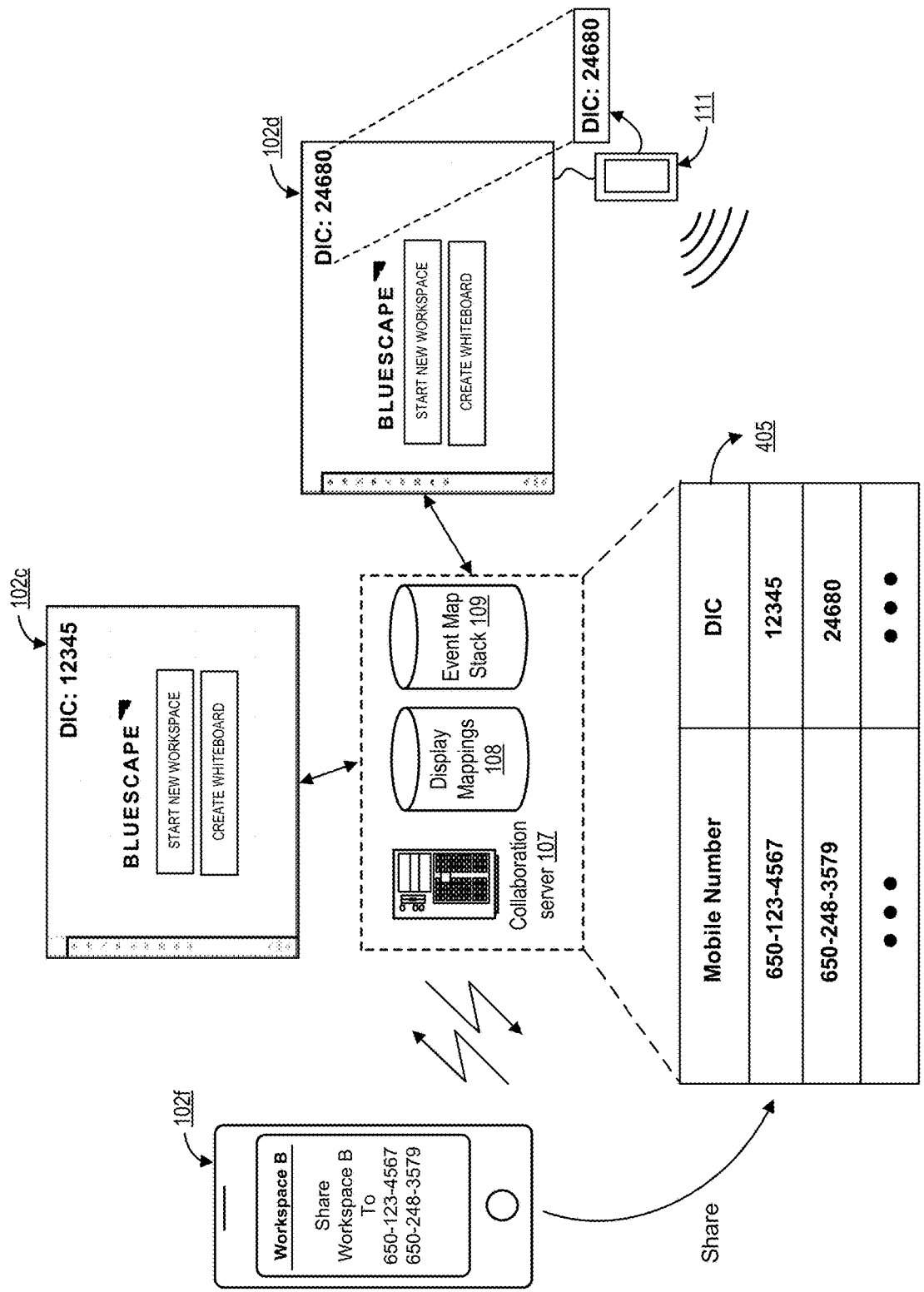
FIGS. 4A and 4B (collectively FIG. 4) illustrate an example of shared digital workspaces sent to multiple display clients using mobile phone numbers.
Figure 4B:
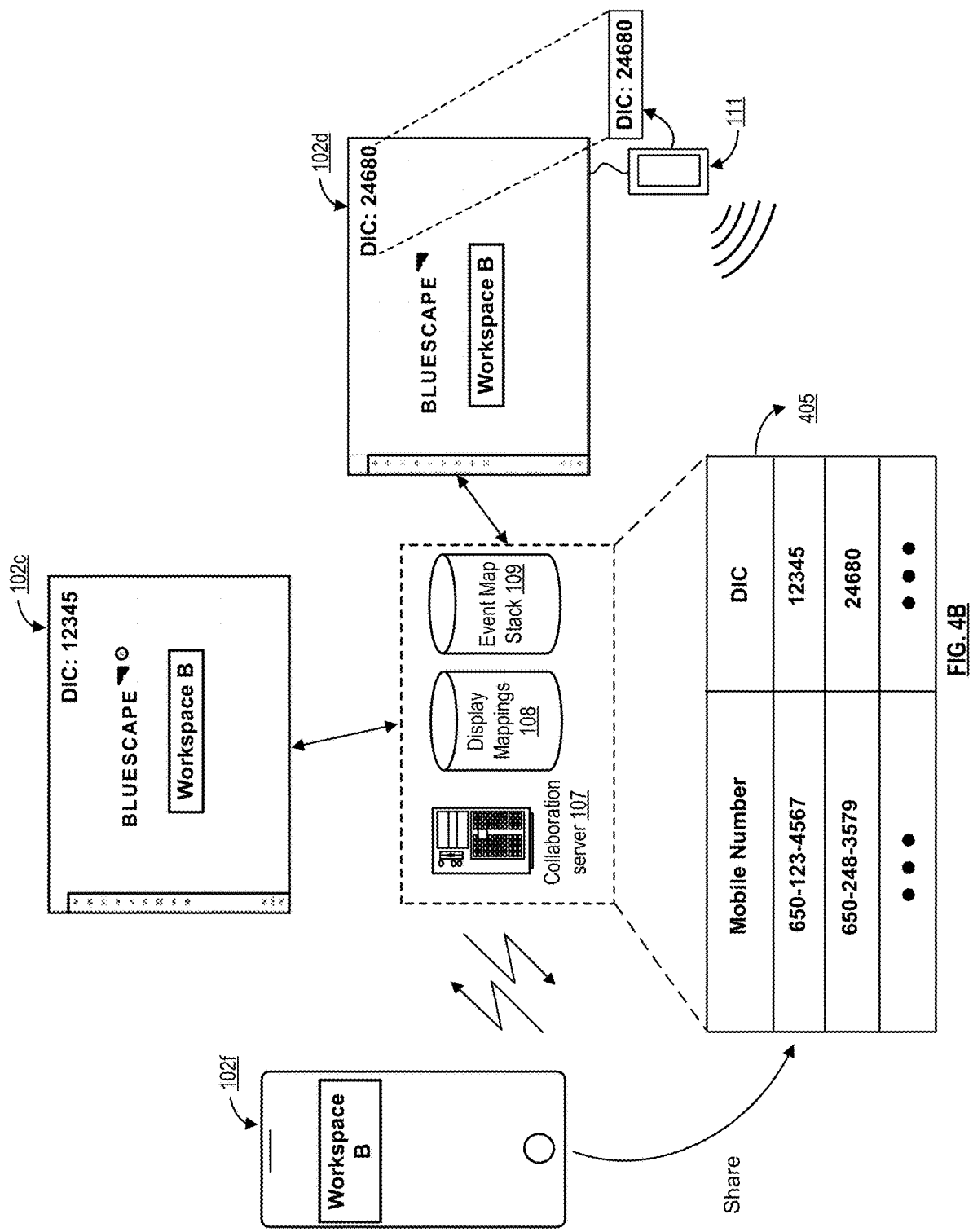

We now present two examples in which the technology disclosed is used to share a workspace with multiple display clients. FIGS. 3A and 3B illustrate a first example in which a user enters display identification codes to identify the display clients. FIGS. 4A and 4B illustrate a second example in which a user enters mobile phone numbers to identify the display clients to send workspace to digital display clients.

FIG. 3A illustrates an example digital collaborative workspace system in which four display clients including a mobile phone 102*f*, a digital display wall 102*c*, a digital display wall 102*d* and a laptop computer 102*b* are connected to the collaboration server 107 through various network connections. As described above, these devices (i.e., the mobile phone 102*f*, the digital display wall 102*c*, the digital display wall 102*d*, the laptop computer 102*b* and the collaboration server 107) can be located in the same room, in different rooms in the same facility or at different facilities around the world.

The digital collaborative workspace system (also referred throughout this document as "the system") can includes logic to identify display clients linked to the server-side network node such as the collaboration server 107. For example, the collaboration server 107 can identify display clients connected thereto. The system (e.g., a network node of the system, such as the collaboration server 107) can send respective display identification codes (DICs) to display clients connected thereto. The respective DICs can be displayed on displays of the display clients. As shown in FIG. 3A, the DICs of respective display clients are displayed on the display clients. The DICs sent by, for example a communication module of the collaboration server 107, can be comprised of various characters such as numbers, letters and symbols or any combination thereof. The number of characters in the DICs should be appropriate for the number of users of the system so as to avoid an instance of running out of DICs and to also provide some security to prevent random selection of a DIC, by a user, to join a collaboration.

Referring to FIG. 3A, a user has entered her credentials to access a shared digital workspace labeled as "workspace A" on the mobile phone 102*f* (e.g., the user provides credentials and selects "workspace A"). It is possible that a shared digital workspace does not require credentials and the user, once connected to the system, is able to just select/identify the desired shared digital workspace. After authenticating the user (e.g., after the user logs onto the system and/or the user provides credentials to gain access to the shared digital workspace), the collaboration server 107 can provide, for display on the mobile phone 102*f*, DICs of available display clients connected to the system. A user can be authenticated using credentials assigned to them, or by using fingerprints, facial recognition, retinal scanning or other methods of physically identifying the user. In an embodiment, access to certain shared digital workspaces can be limited (e.g., read only) or denied based on authorizations associated with the user.

In one embodiment, the DICs of available display clients will not be provided for display on the mobile phone 102*f*. Rather, the user would have to be in the same room as the other display clients and observe, for example, the DIC "12345" displayed by the display wall 102*c* or the DIC "12345" would need to be communicated to the user in some other manner if the user is in a different room, facility or geographical location.

The collaboration server 107 can include a data structure or can be connected to a database in which a list of available display clients is stored. In one embodiment, this list is referred to as "lobby". The user can select one or more display clients to share the digital workspace either by touching the user interface of the mobile phone 102*f*, by entering the DIC in an input text box, or by other input methods such as voice input, etc. For example, the user of the mobile phone 102*f* can select/enter their own DIC (e.g., "56789") and the DICs (e.g., "12345", "24680" and "35792") of the other display clients. Note that in one embodiment the user of the mobile phone 102*f* would not need to enter their own DIC, it would be assumed that the user of the mobile phone 102*f* who is starting or joining the collaboration would be a part of the collaboration. For example, the user could select/enter the DICs of the other three display clients and then the mobile phone 102*f* would send information to the collaboration server 107 that identifies the shard digital workspace, the DIC of the mobile phone 102*f* and the DICs of the other three display clients. Alternatively, the user of the mobile phone 102*f* can collaborate with just one other display client by selecting/identifying the shared digital workspace and the DIC of the other display client.

The collaboration server 107 detects the input from the user including one or more display identification codes (DICs). In this example, the user enters the display identification codes "12345", "35791", and "24680" and the collaboration server 107 receives, via the communication module, information identifying the selections of the user as well as information identifying the user and/or the mobile phone 102*f*. The collaboration server 107 determines that a match exists when a DIC identified by the input from the user matches the DIC sent to the display client. In this example, the collaboration server 107 matches the three requested DICs provided as input by the user to the three display identification codes sent to the three display clients 102*c*, 102*b*, and 102*d* respectively. If a match between the DIC identified by the input from the user does not match the DIC sent to the display client, then the collaboration server 107 determines that a match does not exist, notifies the user and prompts the user to provide a different DIC. If a match is determined to exist, then the collaboration server 107 starts a collaboration (e.g., a collaboration session) by providing access to the shared digital workspace, labelled as "workspace A" to the three display clients as shown in FIG. 3B. In other words, a collaboration is started in dependence upon a determination of whether or not a match or matches exist. In an embodiment, the user who initiated or joined the collaboration can, at any point, disable the display client's access to the shared digital workspace ("workspace A").

Additionally, as described above, a smart dongle 111 can be connected to display 102*d*. This smart dongle 111 includes hardware and software capable of (i) communicating with the collaboration server 107 to obtain the DIC, (ii) communicating with the display 102*d* to provide the DIC for display and to also provide and (iii) communicating with the collaboration server 107 and the display 102*d* to gain access to the shared digital workspace and provide the shared digital workspace to the display. In this example, the display 102*d* can be a "dumb" display that simply displays video and/or audio output from the smart dongle 111. A smart dongle 111 can generate and provide the DIC to the display 102*d* or the collaboration server 107 can generate the DIC, provide the DIC to the smart dongle 111 and then the smart dongle 111 can provide the DIC to the display 102*d*. The smart dongle 111 can generate the DIC at the instruction of the collaboration server 107 or just on its own.

Further, as illustrated in FIG. 3B, "workspace A" is displayed on the mobile phone 102*f* However, other options are available, such that other interfaces are displayed on mobile phone 102*f* while the user is viewing and interacting with "workspace A" on the other display clients. For example, the user can interact with an interface on their mobile phone 102*f* to navigate and interact with "workspace A" while "workspace A" is displayed on display 102*d*. The interface on the mobile phone 102*f* can be configured to act as a track pad, a keyboard for text input, etc. These features are described in more detail below.

FIG. 4A presents a second example in which an authenticated user on a mobile phone 102*f* is requesting to send a shared digital workspace labelled as "workspace B" to display clients 102*c* and 102*d*. The database 108 storing the display mappings includes mapping information 405 that maps cell phone numbers of users to display identification codes (DICs) sent to display clients. The mapping information 405 maps a mobile phone number of a particular user to the display identification code (DIC) sent to or assigned to a display client such as display client 102*c*. The display client 102*d* is connected to a smart dongle 111. The mapping information 405 maps a mobile phone number of a user to the DIC associated with the smart dongle 111 which is registered with a mobile phone number of a user. For example, the mobile phone number 650-123-4567 is mapped to the display identification code 12345 which is associated with the display client 102*c*. Therefore, the display client 102*c* is registered with the phone number 650-123-4567. Similarly, the mobile phone number 650-248-3579 is mapped to the display identification code 24680 which is associated with the smart dongle 111. As the smart dongle 111 is connected to the display client 102*d*, the display identification code 24680 is displayed on the display of the client 102*d*. The display client 102*d* is therefore, registered with the mobile phone number 650-248-3457 via the smart dongle 111. In another embodiment, a mobile phone number can be mapped to more than one display client.

The user of the mobile phone 102*f* enters the mobile phone numbers 650-123-4567 and 650-248-3579 to share "workspace B" with display clients to which these mobile numbers are mapped. In the same manner described above with respect to FIGS. 3A and 3B, the collaboration server 107 detects input from the user including mobile phone numbers entered by the user. The collaboration server 107 determines that the mobile phone number 650-123-4567 matches the first entry in the mapping information 405 and the mobile phone number 650-248-3579 matches the second entry in the mapping information 405. The collaboration server 107 then identifies the DICs of the matching phone numbers and starts a collaboration by providing access to the shared digital workspace (i.e., "workspace B") to the display clients as shown in FIG. 4B. Again, access to the display client 102*d* is provided through the smart dongle 111.

Figure 5A:
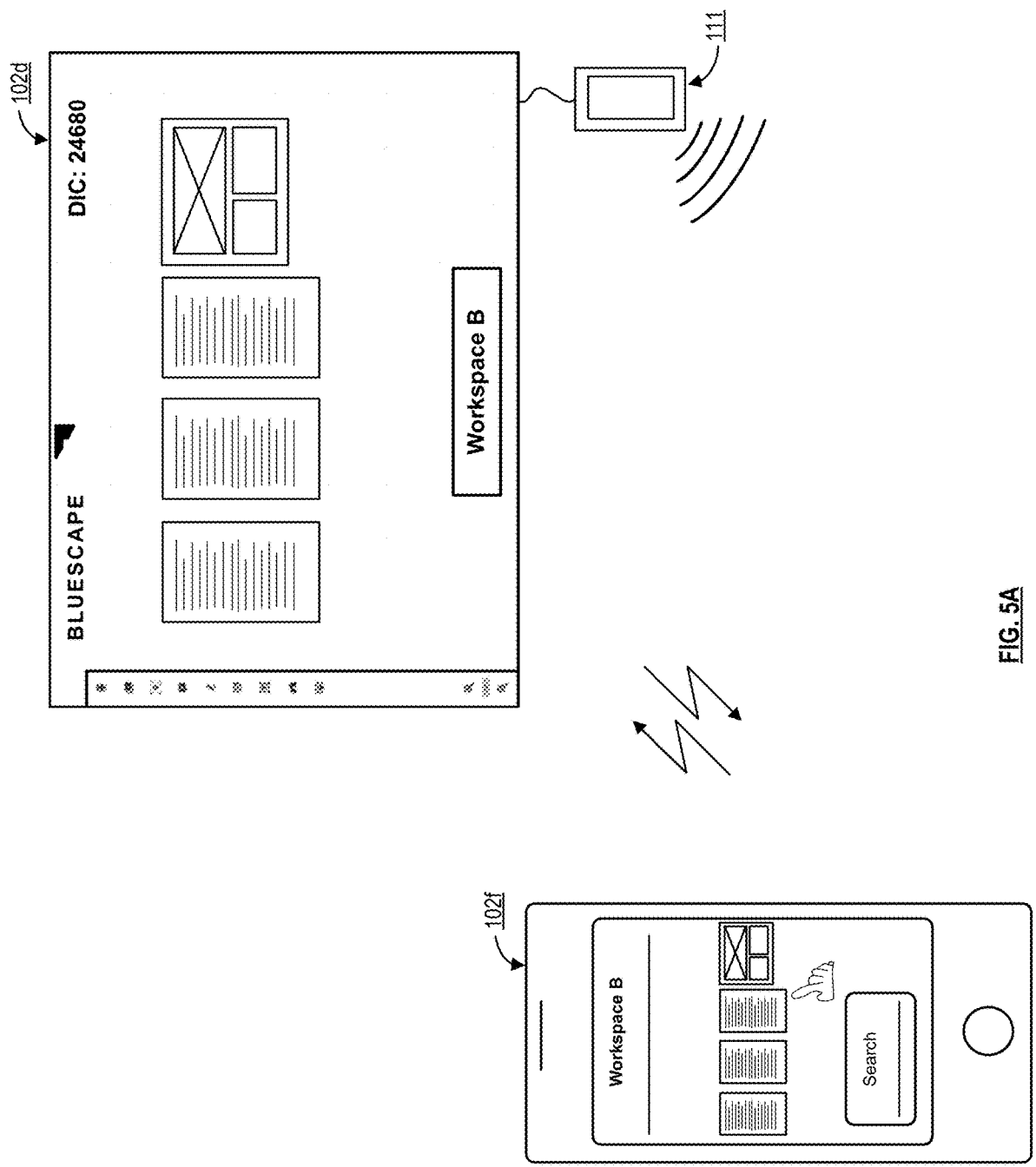
FIGS. 5A and 5B (collectively FIG. 5) illustrate an example of sharing digital workspace content from a mobile device to a digital display wall.
Figure 5B:
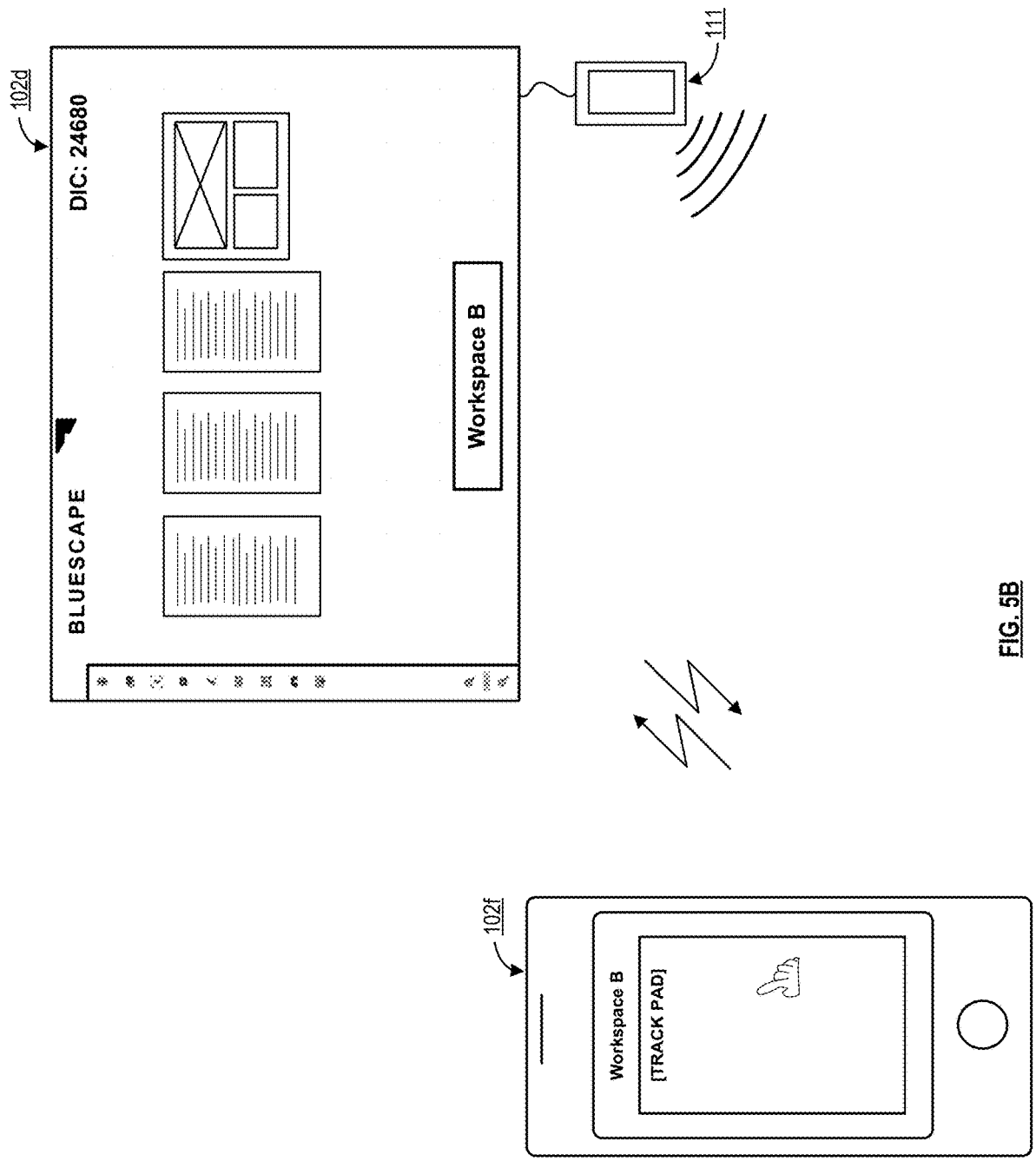

FIGS. 5A and 5B illustrate examples of user interaction with "workspace B" displayed on the display client 102*d*. The display client 102*d*, for example, is not touch enabled and therefore the user cannot interact with the digital assets in "workspace B" by touching on a display surface of the display client 102*d* or by performing other gestures. Therefore, the technology disclosed allows the user to interact with "workspace B" via the mobile phone 102*f*.

As shown in FIG. 5A, the user can interact with the digital assets such as documents by performing gestures on the display of the mobile phone 102*f*. The user can also search workspaces by entering search terms on the user interface of the mobile phone 102*f*. The display surface of the mobile phone 102*f* can also be used as a track pad to navigate through the workspace or to move and organize the digital assets in "workspace B" as shown in FIG. 5B. In other embodiment, the user can enter in search terms on their mobile phone 102*f* to search through the shared digital workspace and the results of the search can be displayed on the other display clients and can optionally be displayed on the mobile phone 102*f* as well.

Figure 6:
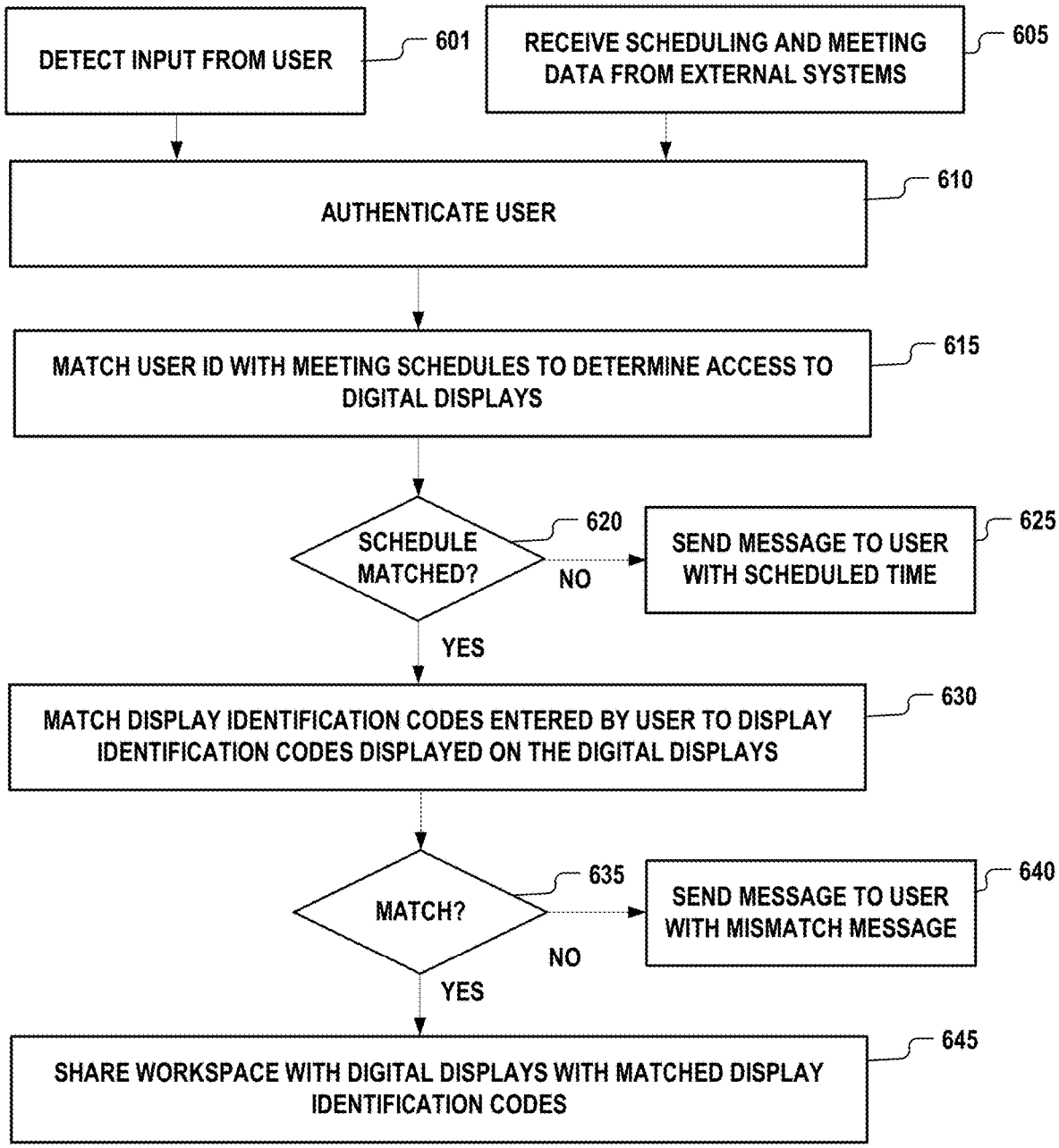
FIG. 6 presents server-side process steps for authorizing sharing of workspace to digital displays upon receiving display identification codes from a user.

FIG. 6 is a flowchart illustrating logic executed by the collaboration server 107, which is a network node of the digital collaborative workspace system. The logic can be implemented using processors programmed using computer programs stored in memory accessible to the digital collaborative workspace system and executable by the processors, by dedicated logic hardware, including field programmable integrated circuits, and by combinations of dedicated logic hardware and computer programs. As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow chart herein shows only steps that are pertinent to an understanding of the invention, and it will be understood that numerous additional steps for accomplishing other functions can be performed before, after and between those shown.

FIG. 6 illustrates logic executed on the server when a user input is detected at a step 601. In addition to the features described above, FIG. 6 describes additional scheduling features provided by the digital collaborative workspace system. The collaboration server 107 of the digital collaborative workspace system can receive input from the user as transmitted from one of a digital display wall, a mobile device, a tablet device, a portable computing device and a desktop computing device. The collaboration server 107 can include logic to authorize the user to access the shared digital workspace from at least one of a display wall, a mobile computing device, a tablet device, a portable computing device and a desktop computing device. The collaboration server 107 can receive scheduling and meeting data from external systems such as Microsoft™ Outlook and Google™ Calendar, etc. (step 605). At a step 610, the collaboration server 107 authenticates the identification of the user in dependence upon the detected input from the user prior to the start of the collaboration. The system can include logic to restrict access to the shared digital workspace by the network node in dependence upon authorization information associated with the authenticated user and with the shared digital workspace. If the user is authorized to access the shared digital workspace from the digital display wall, the mobile device, the tablet device, the portable computing device or the desktop computing device, then the collaboration server matches user identification with meeting schedules received from external systems to determine if the user has access to the digital display clients in the meeting room (step 615). If the user is the organizer or the owner of the meeting scheduled in a meeting room and the time of user's request is within the start and end time of the scheduled meeting (step 620), then the process continues at the following steps. Otherwise, the system sends an error message to the user that she is not authorized to download or access the shared digital workspace (or the workspace) on the display client in the meeting room (step 625).

The collaboration server 107 matches requested display identification codes (DICs) entered by the user to the display identification codes sent to the digital displays at step 630. A match exists when the requested DIC identified by the input from the user matches the DIC sent to the client-side network node also referred to as the display client (step 635). Upon identifying a match, the collaboration server 107 provides the shared digital workspace (or a portion thereof) to the display client or the collaboration server 107 allows the display client to access the shared digital workspace (step 645). Otherwise, the server sends a mismatch message to the user (step 640). The error message can be displayed on the device from which the input from the user was detected by the server. The system can request another input from the user to identify a potential display client (or client-side network node) using another requested DIC.

Figure 7:
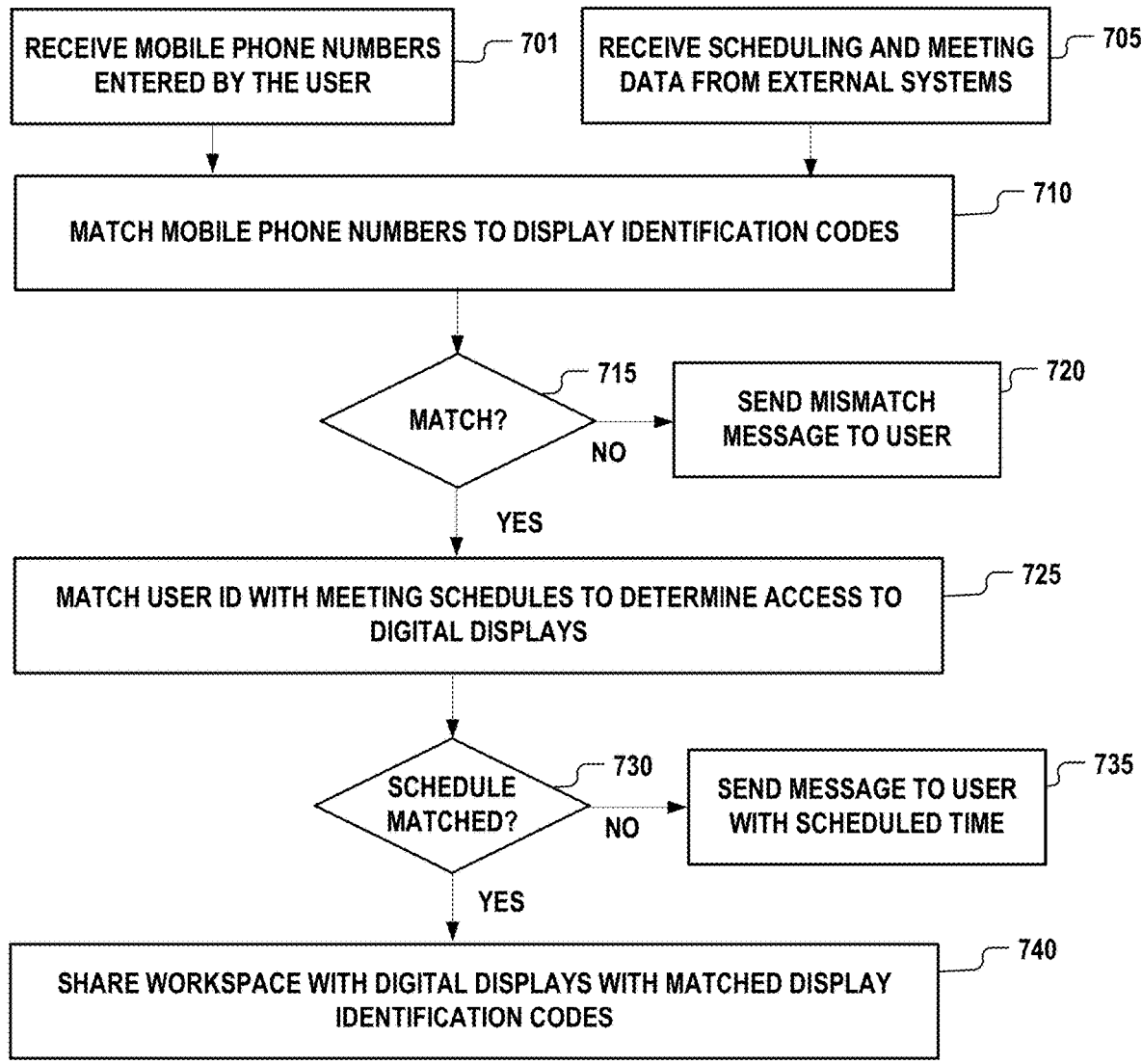
FIG. 7 presents server-side process steps for authorizing sharing of workspace to digital displays upon receiving mobile phone numbers from a user.

FIG. 7 presents flowchart of process steps executed on the server when the user enters mobile phone numbers to download the shared digital workspace (step 701). The system receives scheduling and meeting data from external systems such as Microsoft™ Outlook and Google™ Calendar, etc. (step 705). The system can include a user authentication step 610 as shown in the flowchart of FIG. 6. At a step 710, the collaboration server 107 matches mobile phone numbers entered by the user to display identification codes in the mappings database 108. If a mobile phone number entered by the user does not match a display identification code (step 715), the collaboration server 107 sends a mismatch message to the user (step 720). At a step 725, the collaboration server 107 matches user identification with the information received from the meeting schedules to determine if the user has access to the display clients. This step is similar to step 605 in the flowchart of FIG. 6. Upon identifying a match (step 730), the collaboration server 107 provides the shared digital workspace (or a portion thereof) to the display client or the collaboration server 107 allows the display client to access the shared digital workspace (step 740). Otherwise, the system sends a schedule mismatch message to the user (step 735).

Figure 8:
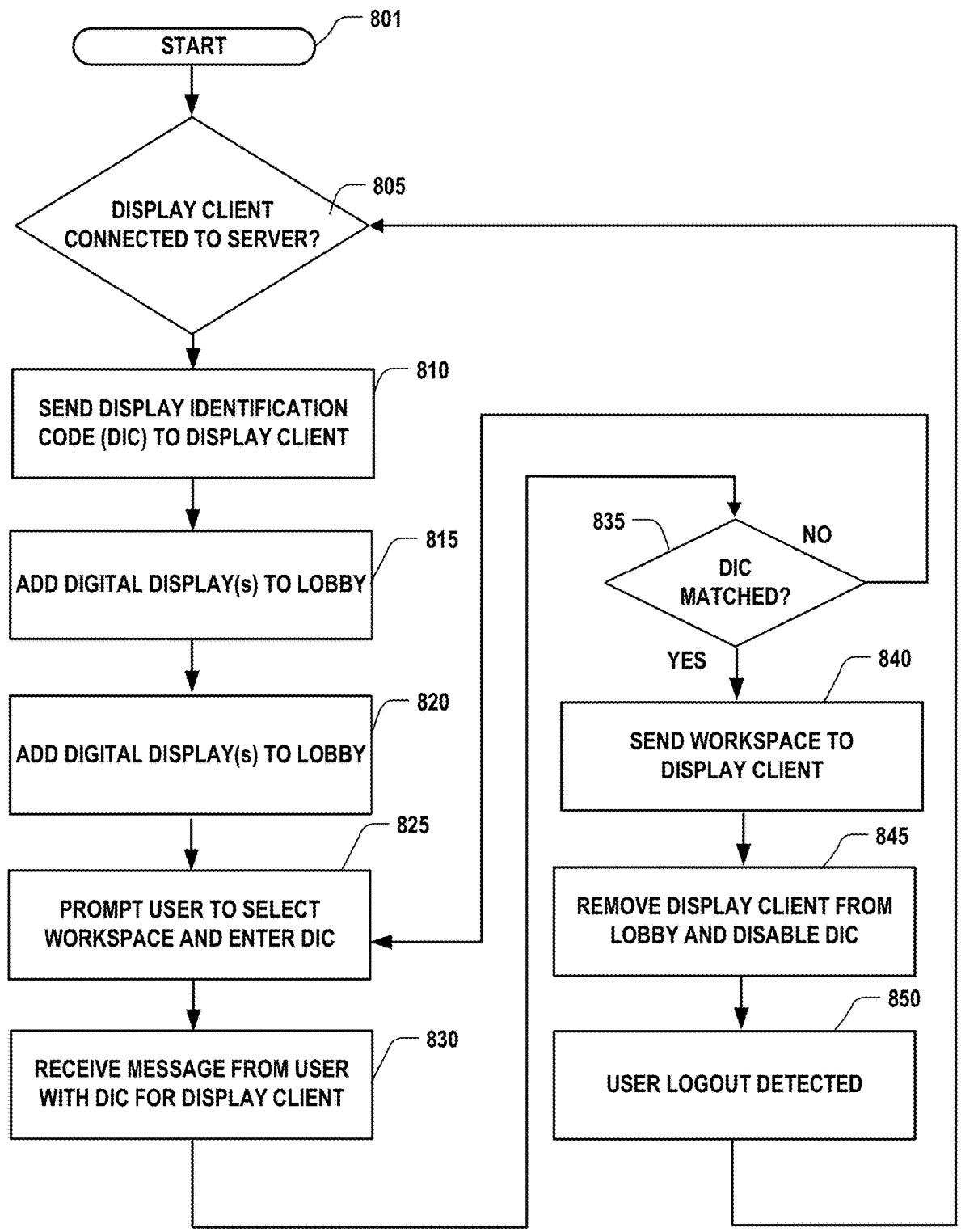
FIG. 8 presents server-side process steps for assigning display identification codes to digital displays and disabling display identification code sent to a display during a collaboration meeting.

FIG. 8 presents a flowchart of server-side process steps to send display identification code to an available display client and send (or upload) a shared digital workspace (or a portion thereof) to the display client. The process starts at a step 801. At a step 805 the collaboration server 107 detects a free display client connected thereto. The collaboration server 107 sends a display identification code (DIC) to the display client at a step 810. The digital display is added to the above-described lobby at a step 815. The lobby includes digital display clients that are available for collaboration meetings. At a step 820 the system receives login credentials from a user and authenticates the user. Upon authenticating the user, the collaboration server 107 presents a list of workspaces to the user at a step 825. The user selects a workspace for collaboration and enters one or more display identification codes (DICs) for sending the workspace to display clients. The system can present a list of display identification codes of available display clients to the user to select from. The user can input or select one or more display identification codes on the user interface of the client device. Alternatively, the user is not presented with a list of workspaces and or DICs, but rather must identify a desired workspace and/or desired DICs without selection from a list.

The collaboration server 107 receives requested DICs from the user at a step 830. The collaboration server 107 attempts to match the requested DICs to DICs in the display mappings database. If a requested DIC entered by the user does not match a DIC sent to a display client (NO at step 835), then the user is alerted and then prompted to select and/or enter a different DIC (step 820). If a requested DIC entered by the user matches a DIC sent to a display client by the collaboration server 107 (YES at step 835) by the collaboration server 107, then the collaboration server 107 sends (or provides access to) the shared digital workspace (or a portion thereof) to the display client (step 840). The collaboration server 107 can remove the display client from the lobby and temporarily disable the DIC of the display client (step 845). Accordingly, the display client is not available for any other collaboration for the duration of the collaboration. In other words, other users are prevented from starting another collaboration on the display client. At a step 850, the collaboration server 107 receives a logout message from the user at the end of the collaboration. Then the temporarily disabled DIC can be re-enabled. In one embodiment, the system can change the DIC previously provided to the display client (i.e., the display client gets a new or replacement DIC). This embodiment represents an example of implementing one-time display identification codes (DICs). In such an embodiment, a new DIC is sent to the display client when the display client becomes available for a collaboration meeting.

In a further embodiment, a duration of time is associated with each DIC by the digital collaborative workspace system. For example, a time of 60 minutes can be associated with a particular DIC, such that at the expiration of the duration of time (which begins when a collaboration associated with the DIC begins) the collaboration is terminated and/or a message can be displayed to the user or users. In an embodiment, the user or users can be given the option to extend the duration of time by a predetermined amount of time. In another embodiment, the user or users will not be able to extend the duration of time because other users may be scheduled to conduct a collaboration using the same display clients. As described above with FIGS. 1A, 1B, 7 and 8, a scheduling system 105 (e.g., an electronic calendar) can be used to set the duration of time, such that the DICs are only available to users (or certain users attending the scheduled collaboration) during the scheduled time of the meeting. At the scheduled ending time of the meeting (as indicated by the electronic calendar), the users can be notified and/or the collaboration can be terminated.

FIGS. 9A, 9B, 9C, 9D, 9E, 9F, 9G and 9H represent data structures which can be part of workspace data maintained by the display mappings database 108 and event map stack database 109 at the collaboration server 107. In FIG. 9A, an event data structure is illustrated. An event is an interaction with the workspace that can result in a change in workspace data. An interaction event can occur during a collaboration, therefore the event can include the meeting identifier identifying the collaboration. An event can include an event identifier, a category identifier, a user identifier, a timestamp, a session identifier, an event type parameter, the client identifier, and an array of locations in the workspace, which can include one or more locations for the corresponding event. It is desirable for example that the timestamp have resolution on the order of milliseconds or even finer resolution, in order to minimize the possibility of race conditions for competing events affecting a single object. Also, the event data structure can include a UI target, which identifies an object in the workspace data to which a stroke on a touchscreen at a client display is linked. Events can include style events, which indicate the display parameters of a stroke for example. The events can include a text type event, which indicates entry, modification or movement in the workspace of a text object. The events can include a card type event, which indicates the creation, modification or movement in the workspace of a card type object. The events can include a stroke type event which identifies a location array for the stroke, and display parameters for the stroke, such as colors and line widths for example.

Events can be classified as persistent, history events and as ephemeral events. Processing of the events for addition to workspace data and sharing among users can be dependent on the classification of the event. This classification can be inherent in the event type parameter, or an additional flag or field can be used in the event data structure to indicate the classification.

A spatial event map can include a log of events having entries for history events, where each entry comprises a structure such as illustrated in FIG. 9A. The server-side network node includes logic to receive messages carrying ephemeral and history events from client-side network nodes, and to send the ephemeral events to other client-side network nodes without adding corresponding entries in the log, and to send history events to the other client-side network nodes while adding corresponding entries to the log.

FIG. 9B presents a displays data structure. The displays data structure includes information related to the display clients such as the display identification code (DIC) sent to the display client, a facility identifier, a location identifier (identifying a meeting room or office in a facility), and an available flag indicating whether the display client is available for a collaboration. The available flag is set to false when the display client is used in a collaboration.

FIG. 9C presents a phone numbers data structure. In the phone numbers data structure, a mapping of the phone numbers of the users to display clients is maintained. For example, this data structure can include the display identification code (DIC) and a user identifier.

FIG. 9D presents a meetings data structure. The meeting data structure can be used to identify a meeting. The system can use the information received from external systems such as scheduling and conferencing systems to identify meeting attributes. The meeting data structure can store a meeting identifier, the start time of the meeting and end time of the meeting. The meeting data structure can also include user identifiers of users who are participating in the meeting, an identifier of the meeting owner or meeting organizer, a number of participants in the meeting, etc.

FIG. 9E illustrates a card data structure. The card data structure can provide a cache of attributes that identify current state information for an object in the workspace data, including a session identifier, a card type identifier, an array identifier, the client identifier, dimensions of the cards, type of file associated with the card, and a session location within the workspace.

FIG. 9F illustrates a data structure which consolidates a number of events and objects into a catchable set called a chunk. The data structure includes a session ID, and identifier of the events included in the chunk, and a timestamp at which the chunk was created.

FIG. 9G illustrates the data structure for links to a user participating in a session in a chosen workspace. This data structure can include an access token, the client identifier for the session display client, the user identifier linked to the display client, a parameter indicating the last time that a user accessed a session, and expiration time and a cookie for carrying various information about the session. This information can, for example, maintain a current location within the workspace for a user, which can be used each time that a user logs in to determine the workspace data to display at a display client to which the login is associated. A user session can also be linked to a meeting. One or more users can participate in a meeting. A user session data structure can identify the meeting in which a user participated in during a given collaboration meeting. Linking a user session to a meeting enables the technology disclosed to determine the identification of the users and the number of users who participated in the meeting.

FIG. 9H illustrates a display array data structure which can be used in association with large-format displays that are implemented by federated displays, each having a display client. The display clients in such federated displays cooperate to act as a single display. The workspace data can maintain the display array data structure, which identifies the array of displays by an array ID and identifies the session position of each display. Each session position can include an x-offset and a y-offset within the area of the federated displays, a session identifier, and a depth.

The system can encrypt communications with client-side network nodes and can encrypt the database in which the spatial event maps are stored. Also, on the client-side network nodes, cached copies of the spatial event map are encrypted in some embodiments, to prevent unauthorized access to the data by intruders who gain access to the client-side computers.

Figure 10:
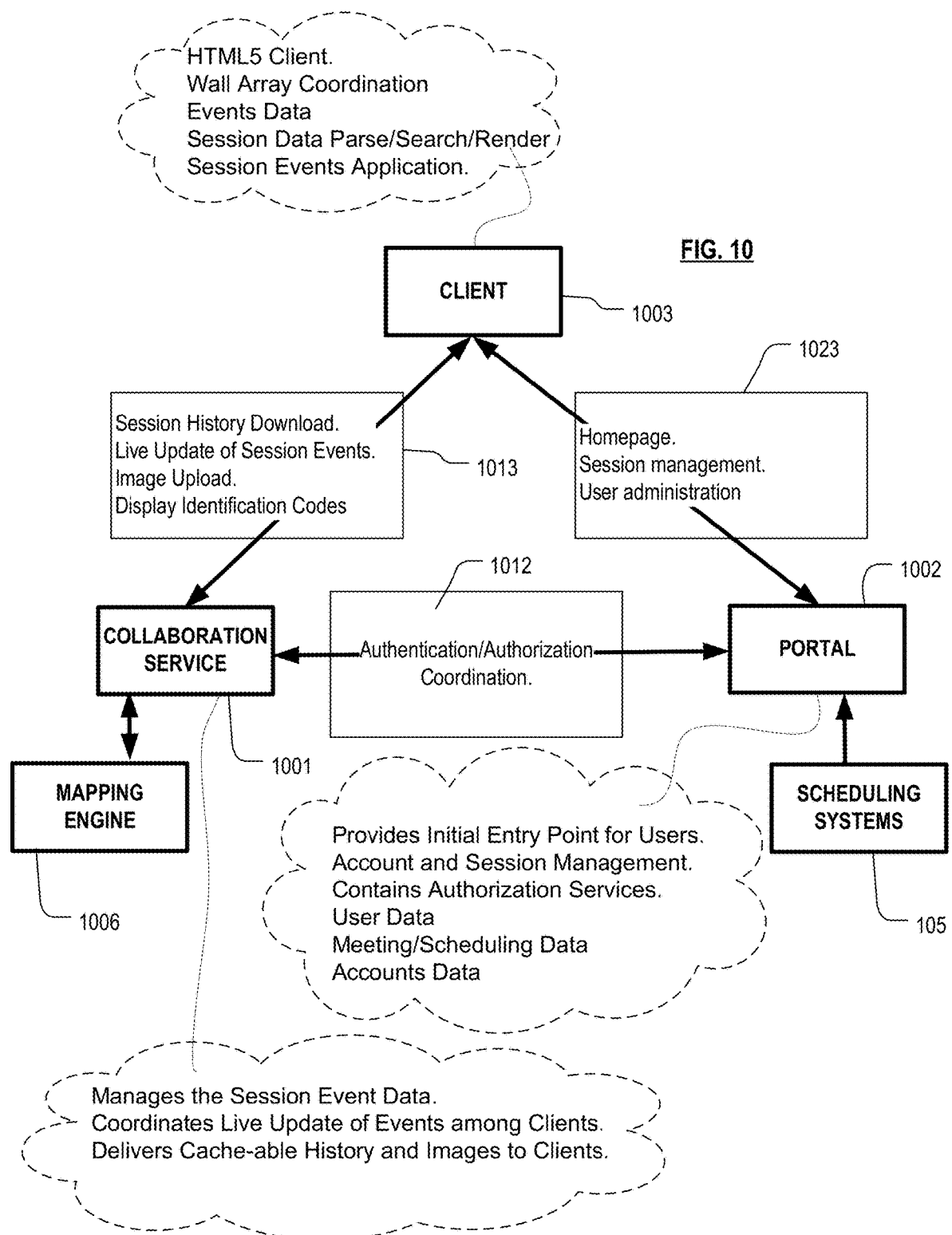
FIG. 10 is a simplified functional architecture for a distributed collaboration system.

FIG. 10 is a diagram representing a functional architecture for a distributed collaboration system used to create, modify, distribute and display workspace data for a workspace. The basic configuration includes a collaboration service 1001 which manages display mappings and event data executed by a server, such as collaboration server 107, a portal service 1002 which can be executed by a server such as collaboration server 107 or located in other computer systems accessible to the server, such as a peer network node, and a display client 1003 located at a client-side network node, at which the user interaction is active. The display client 1003 is in communication with the collaboration service 1001 and with the portal 1002. The communication channel 1013 between the display client 1003 and a collaboration service 1001 manages the download of session history, and the live update of session events. Also, across this communication channel 1013, a display client 1003 can upload images that can be associated with events to the collaboration service 1001. The collaboration service 1001 uses the communication channel to send display identification codes to display clients. The collaboration service 1001 also uses the communication channel 1013 to receive messages from display clients when they are available and then adds the display clients to a list of display clients that available for collaborations (also referred to as lobby above). The collaboration service is in communication with a mapping engine 1006. The mapping engine 1006 maps display identification codes to display clients. It also maps the users' phone numbers to display identification codes and this maintains a mapping of user phone numbers to display clients. The mapping engine stores the mapping data in the display mappings database 108.

The display client 1003 is in communication with the portal 1002 across communication channel 1023. The portal 1002 manages a homepage for the workspace data (also referred to as shared digital workspace), session management and user administration. This portal can be utilized for user login, authentications, and for delivering image files and the like as an alternative to, and in parallel with, the communication channel 1013. The collaboration service 1001 and portal 1002 are in communication across channel 1012. The collaboration service 1001 and portal 1002 manage authentication and authorization protocols, and coordinate session administration, and workspace data management.

The display client 1003 can be part of a client-side network node including a physical or virtual computer system having computer programs stored in accessible memory that provide logic supporting the collaboration, including an HTML 5 client, wall array coordination logic for display array implementations, workspace data parsing searching and rendering logic, and a session events application to manage live interaction with workspace data at the server and the display wall.

The portal 1002 can be part of a server-side network node including a physical or virtual computer system having computer programs stored in accessible memory, that provide logic supporting user access to the collaboration server. The logic can include applications to provide initial entry points for users, such as a webpage with login resources, logic to manage user accounts and session anticipation, logic that provides authorization services, such as OAuth-based services, and account data. The portal 1002 communicates to scheduling systems 105. The portal can therefore, collect user data and meeting data from the scheduling systems.

The collaboration service 1001 can be part of a server-side network node including, and can manage the session event data, coordinate updated events among clients, deliver catchable history and images to clients, and control access to a database stored in the workspace data. The collaboration service communicates with a classification engine that can classify interaction events into categories.

A spatial event map system can include an API executed in coordination by client-side and server-side resources including any number of physical and virtual machines. One example of an API is described below. An API can be defined in a variety of ways, while including the elements supporting maintenance of a spatial event map in a server-side network node or nodes and supporting sharing of the spatial event map with one or a plurality of active client-side network nodes. In this example, the API is broken down in this example into processes managed by two servers:

Socket Requests Server (Websockets)—used for updating clients with relevant data (new strokes, cards, clients, etc.) once connected. Also handles the initial connection handshake.

Service Requests Server (HTTP/REST)—used for cacheable responses, as well as posting data (i.e., images and cards)

Client-side network nodes are configured according to the API and include corresponding socket requests clients and service requests clients.

History Event

All persistent events are sent as HistoryEvent. This includes for example, moving windows, setting text, deleting windows, creating windows. HistoryEvents are written to the session's history and returned when the history is retrieved. HistoryEvents are sent to the server without an eventId. The server assigns an eventId and broadcasts the event to all clients (including the originating client). New object ids can be reserved using the oid message.

Basic Message Format

```
// server <-- client [client-id, "he", target-id, event-type, event-properties]
client-id - - (string) the ID of the originating client
target-id - - (string) the ID of the target object/widget/app to which this event is relevant
event-type - - (string) an arbitrary event type
properties - - (object) a JSON object describing pertinent key / values for the event.
// server --> client[client-id, "he", target-id, event-id, event-type, event-properties]
client-id - - (string) the ID of the originating client
target-id - - (string) the ID of the target window to which this event is relevant
event-id - - (string) the ID of the event in the database
event-type - - (string) an arbitrary event type
properties - - (object) a JSON object describing pertinent key / values for the event.
// server--> client format of 'he' is: [<clientId>, <messageType>, <targetId>, <eventId>
Note: The eventId will also be included in history that is fetched via the HTTP API.
```

History Events by Object/Application Type

Session
    Create—Add a note or image on the work session
    stroke—Add a pen or eraser stroke on the background Note
    text—Sets or update the text and/or text formatting of a note.
    delete—Remove the note from the work session
    position—Update the size or location of the note in the work session
    pin—Pin or unpin the note
    stroke—Add a pen or eraser stroke on top of the image Image
    delete—Remove the note from the work session
    position—Update the size or location of the note in the work session
    pin—Pin or unpin the note
    stroke—Add a pen or eraser stroke on top of the image Volatile Event Volatile events are ephemeral events not recorded in the undo/playback event stream, so they're good for in-progress streaming events like dragging a card around the screen, and once the user lifts their finger, a HistoryEvent is used to record its final place.

```
// server <--> client[client-id, "ve", target-id, event-type, event-properties]
   client-id - - (string) the ID of the originating client
   target-id - - (string) the ID of the target window to which this event is relevant
   event-type - - (string) an arbitrary event type
   properties - - (object) a JSON object describing pertinent key / values for the event.
```

Figure 11:
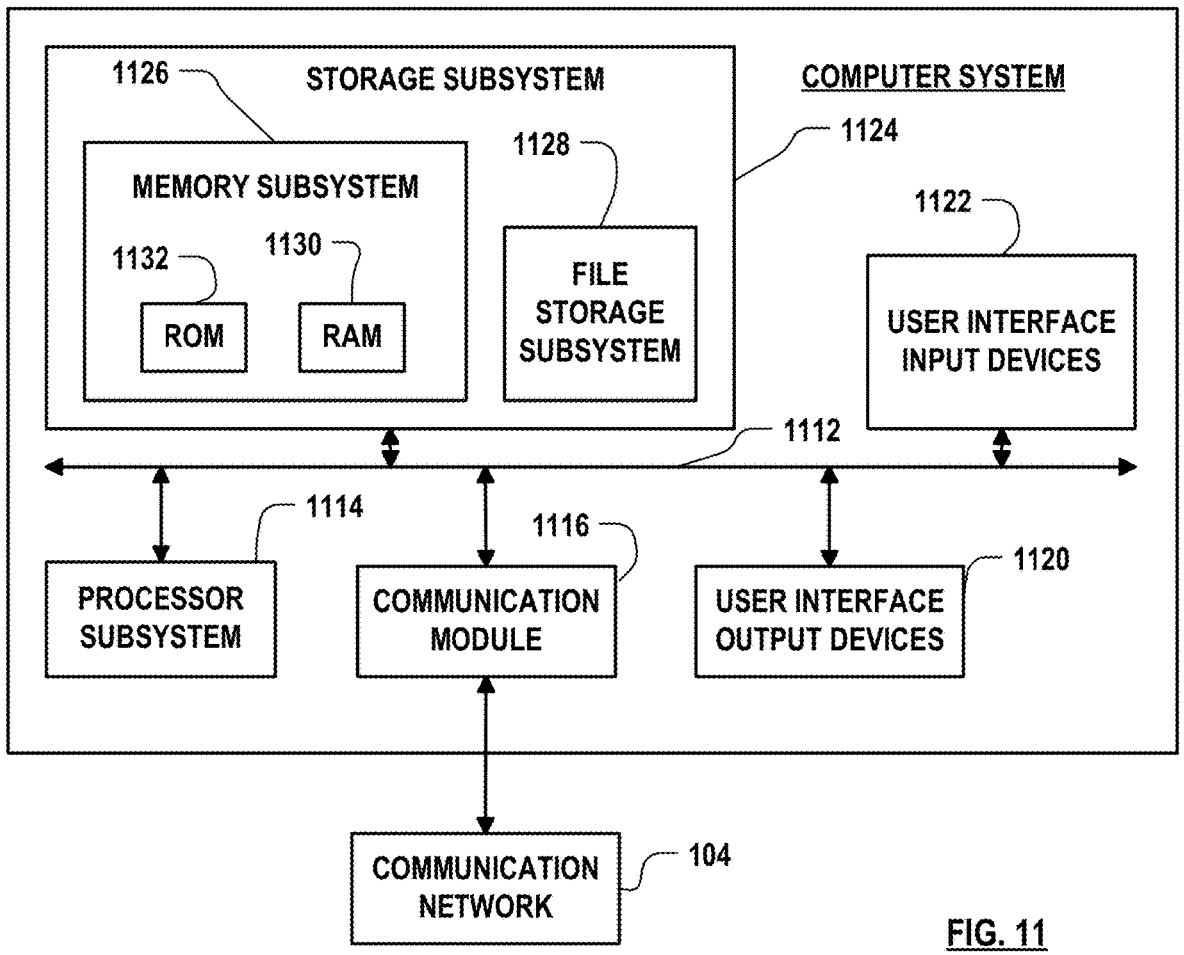
FIG. 11 is a simplified block diagram of the computer system 110, e.g., a client device computer system (FIG. 1B).

FIG. 11 is a simplified block diagram of a computer system, or network node, which can be used to implement the client-side functions (e.g., computer system 110 or smart dongle 111) or the server-side functions (e.g., server 107) in a distributed collaboration system. A computer system typically includes a processor subsystem 1114 which communicates with a number of peripheral devices via bus subsystem 1112. These peripheral devices may include a storage subsystem 1124, comprising a memory subsystem 1126 and a file storage subsystem 1128, user interface input devices 1122, user interface output devices 1120, and a communication module 1116. The input and output devices allow user interaction with the computer system. Communication module 1116 provides physical and communication protocol support for interfaces to outside networks, including an interface to communication network 104, and is coupled via communication network 104 to corresponding communication modules in other computer systems. Communication network 104 may comprise many interconnected computer systems and communication links. These communication links may be wireline links, optical links, wireless links, or any other mechanisms for communication of information, but typically it is an IP-based communication network, at least at its extremities. While in one embodiment, communication network 104 is the Internet, in other embodiments, communication network 104 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1122 may include a keyboard, pointing devices such as a mouse, trackball, touchpad, or graphics tablet, a scanner, a touch screen incorporated into the display (including the touch sensitive portions of large format digital display such as 102c), audio input devices such as voice recognition systems, microphones, and other types of tangible input devices. In general, use of the term "input device" is intended to include all possible types of devices and ways to input information into the computer system or onto computer network 104.

User interface output devices 1120 may include a display subsystem, a printer, a fax machine, or non-visual displays such as audio output devices. The display subsystem may include a cathode ray tube (CRT), a flat panel device such as a liquid crystal display (LCD), a projection device, or some other mechanism for creating a visible image. In the embodiment of FIG. 1B, it includes the display functions of large format digital display such as 102c. The display subsystem may also provide non-visual display such as via audio output devices. In general, use of the term "output device" is intended to include all possible types of devices and ways to output information from the computer system to the user or to another machine or computer system.

Storage subsystem 1124 stores the basic programming and data constructs that provide the functionality of certain embodiments of the present invention.

The storage subsystem 1124 when used for implementation of server-side network-nodes, comprises a product including a non-transitory computer readable medium storing a machine-readable data structure including a spatial event map which locates events in a workspace, wherein the spatial event map includes a log of events, entries in the log having a location of a graphical target of the event in the workspace and a time. Also, the storage subsystem 1124 comprises a product including executable instructions for performing the procedures described herein associated with the server-side network node.

The storage subsystem 1124 when used for implementation of client-side network-nodes, comprises a product including a non-transitory computer readable medium storing a machine-readable data structure including a spatial event map in the form of a cached copy as explained below, which locates events in a workspace, wherein the spatial event map includes a log of events, entries in the log having a location of a graphical target of the event in the workspace and a time. Also, the storage subsystem 824 comprises a product including executable instructions for performing the procedures described herein associated with the client-side network node.

For example, the various modules implementing the functionality of certain embodiments of the invention may be stored in storage subsystem 824. These software modules are generally executed by processor subsystem 814.

Memory subsystem 1126 typically includes a number of memories including a main random-access memory (RAM) 1130 for storage of instructions and data during program execution and a read only memory (ROM) 1132 in which fixed instructions are stored. File storage subsystem 1128 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs and may be stored by file storage subsystem 1128. The host memory 1126 contains, among other things, computer instructions which, when executed by the processor subsystem 1114, cause the computer system to operate or perform functions as described herein. As used herein, processes and software that are said to run in or on "the host" or "the computer," execute on the processor subsystem 1114 in response to computer instructions and data in the host memory subsystem 1126 including any other local or remote storage for such instructions and data.

Bus subsystem 1112 provides a mechanism for letting the various components and subsystems of a computer system communicate with each other as intended. Although bus subsystem 1112 is shown schematically as a single bus, alternative embodiments of the bus subsystem may use multiple busses.

The computer system itself can be of varying types including a personal computer, a portable computer, a workstation, a computer terminal, a network computer, a television, a mainframe, a server farm, or any other data processing system or user device. In one embodiment, a computer system includes several computer systems, each controlling one of the tiles that make up the large format display such as 102c. Due to the ever-changing nature of computers and networks, the description of computer system 110 depicted in FIG. 11 is intended only as a specific example for purposes of illustrating the preferred embodiments of the present invention. Many other configurations of the computer system are possible having more or less components than the computer system depicted in FIG. 11. The same components and variations can also make up each of the other devices 102, and 111 in the collaboration environment of FIG. 1, as well as the collaboration server 107 and databases 108 and 109.

Certain information about the drawing regions active on the digital display 102c are stored in a database accessible to the computer system 110 of the display client. The database can take on many forms in different embodiments, including but not limited to a MongoDB database, an XML database, a relational database or an object-oriented database.

Figure 12:
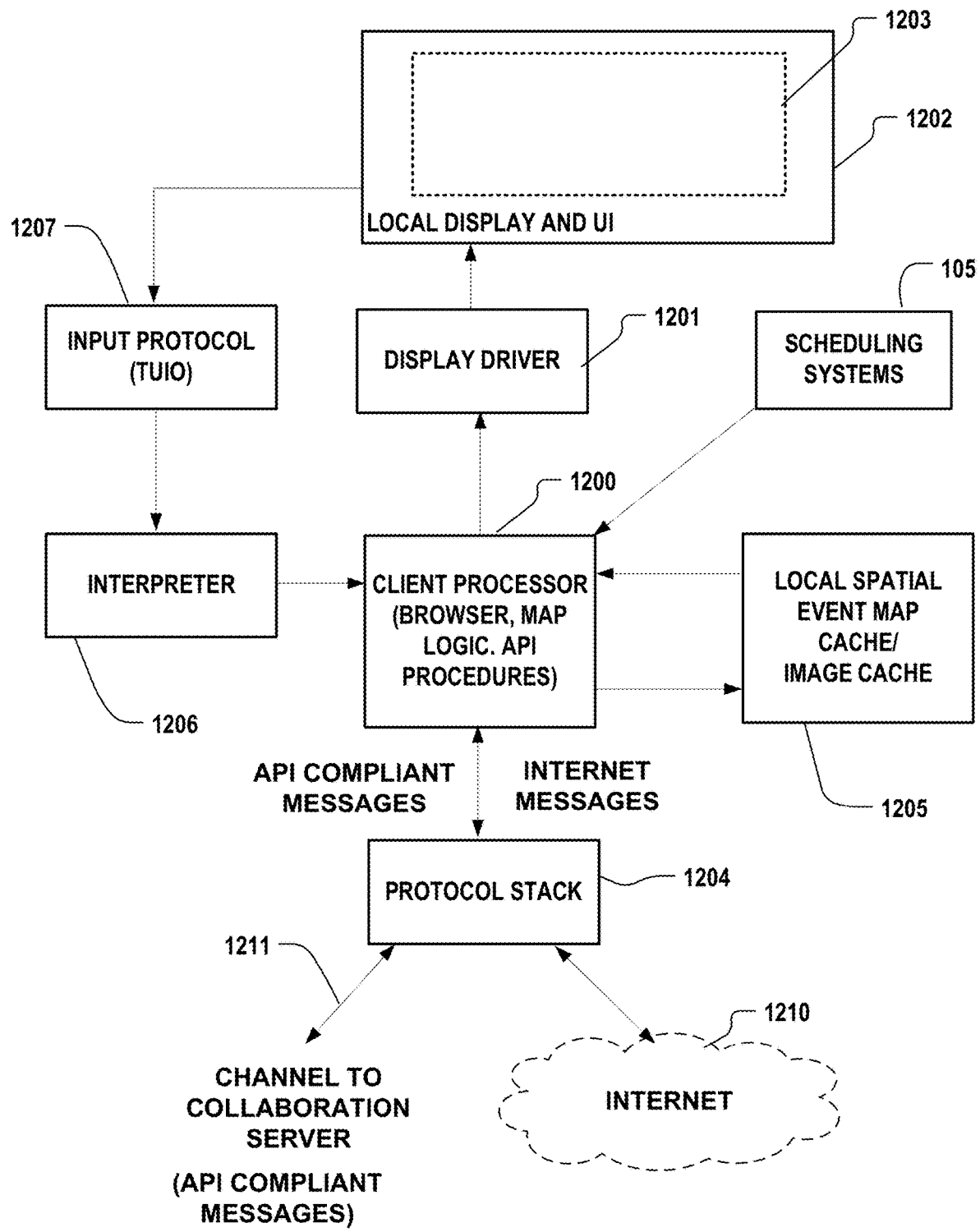
FIG. 12 is a simplified functional block diagram of a client-side network node and display.

FIG. 12 is a simplified diagram of a client-side network node, including a client processor 1200, a display driver 1201, a local display and user interface such as a touchscreen 1202, a protocol stack 1204 including a communication interface controlled by the stack, local memory 1205 storing a cache copy of the live spatial event map and a cache of images and other graphical constructs used in rendering the displayable area, and input protocol device 1207 which executes a input protocol which translates input from a tangible user input device such as a touchscreen, or a mouse, into a form usable by a command interpreter 1206. A suitable input protocol device 1207 can include software compatible with a TUIO industry-standard, for example for interpretation of tangible and multi-touch interaction with the display wall. The protocol stack 1204 receives API compliant messages and Internet messages from the client processor 1200 and as discussed above includes resources to establish a channel 1211 to a collaboration server across which API compliant messages can be exchanged, and a link 1210 to the Internet in support of other communications that serve the local display 1202. The scheduling systems 105 can also be in communication with the client processor 1200 to send meeting related data such as meeting identifier and information about the participants in a meeting. The client processor can then pass the meeting related data to the collaboration server. The display driver 1201 controls a displayable area 1203 on the local display 1202. The displayable area 1203 can be logically configured by the client processor or other programming resources in the client-side network node. Also, the physical size of the displayable area 1203 can be fixed for a given implementation of the local display. The client processor 1200 can include processing resources such as a browser, mapping logic used for translating between locations on the displayable area 1203 and the workspace, and logic to implement API procedures.

The client-side network node shown in FIG. 12 illustrates an example including an application interface including a process to communicate with the server-side network node. The client-side network node shown in FIG. 12 illustrates an example configured according to an API, wherein the events include a first class of event designated as history events to be distributed among other client-side network nodes and to be added to the spatial event log in the server-side network node, and a second class of event designated as ephemeral to be distributed among other client-side network nodes but not added to the spatial event log in the server-side network node.

Figure 13:
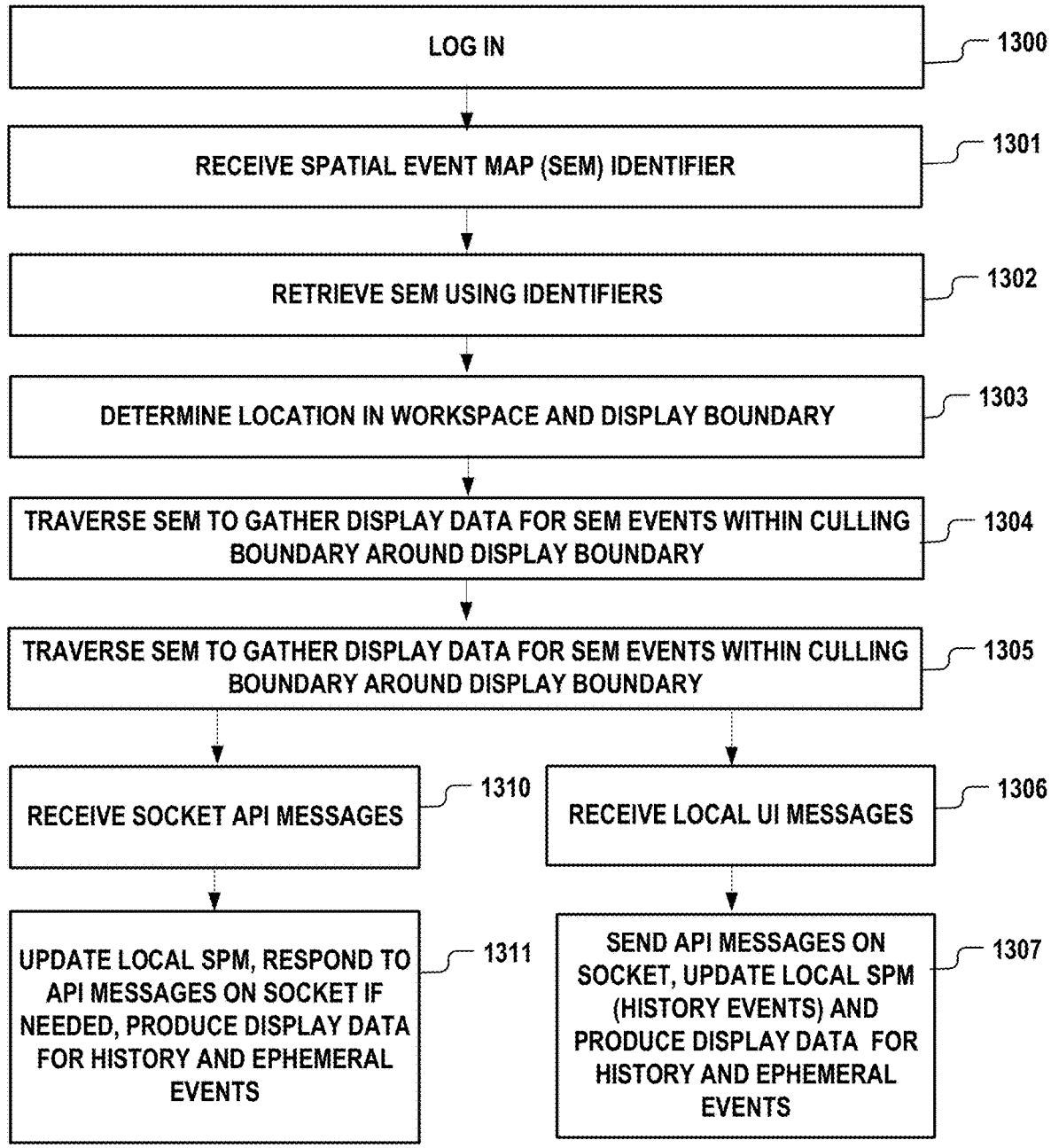
FIG. 13 is a flowchart illustrating operation of client-side network node like that of FIG. 12.

FIG. 13 is a simplified flow diagram of a procedure executed by the client-side network node. The order illustrated in the simplified flow diagram is provided for the purposes of illustration and can be modified as suits a particular implementation. Many of the steps for example, can be executed in parallel. In this procedure, a client login is executed (1300) by which the client is given access to a specific collaboration session and its spatial event map. The collaboration server provides an identifier of, or identifiers of parts of, the spatial event map which can be used by the client to retrieve the spatial event map from the collaboration server (1301). The client retrieves the spatial event map, or at least portions of it, from the collaboration server using the identifier or identifiers provided (1302).

For example, the client can request all history for a given workspace to which it has been granted access as follows:

curl http://localhost:4545/<sessionId>/history

The server will respond with all chunks (each its own section of time):

```
["/<sessionId>/history/<startTime>/<endTime>?b=1"]
["/<sessionId>/history/<startTime>/<endTime>?b=1"]
```

For each chunk, the client will request the events:

```
Curl http: //localhost:4545/<sessionId>/history/<startTime>/
<endTime>?b =<cache-buster>
```

Each responded chunk is an array of events and is cacheable by the client:

```
[
    [
        4,
        "sx",
        "4.4",
        [537, 650, 536, 649, 536, 648, ...],
        {
            "size": 10,
            "color": [0, 0, 0, 1],
            "brush": 1
        },
        1347644106241,
        "cardFling"
    ]
]
```

The individual messages might include information like position on screen, color, width of stroke, time created etc.

The client then determines a location in the workspace, using for example a server provided focus point, and display boundaries for the local display (1303). The local copy of the spatial event map is traversed to gather display data for spatial event map entries that map to the displayable area for the local display. In some embodiments, the client may gather additional data in support of rendering a display for spatial event map entries within a culling boundary defining a region larger than the displayable area for the local display, in order to prepare for supporting predicted user interactions such as zoom and pan within the workspace (1304). The client processor executes a process using spatial event map events, ephemeral events and display data to render parts of the spatial event map that fall within the display boundary (1305). This process receives local user interface messages, such as from the TUIO driver (1306). Also, this process receives socket API messages from the collaboration server (1310). In response to local user interface messages, the process can classify inputs as history events and ephemeral events, send API messages on the socket to the collaboration server for both history events and ephemeral events as specified by the API, update the cached portions of the spatial event map with history events, and produce display data for both history events and ephemeral events (1307). In response to the socket API messages, the process updates the cached portion of the spatial event map with history events identified by the server-side network node, responds to API messages on the socket as specified by the API, and produce display data for both history events and ephemeral events about which it is notified by the socket messages (1311).

Logging in and downloading spatial event map.
1. The client request authorization to join a collaboration session and open a workspace.
2. The server authorizes the client to participate in the session and begin loading the spatial event map for the workspace.
3. The client requests an identification, such as a "table of contents" of the spatial event map associated with the session.
4. Each portion of the spatial event map identified in the table of contents is requested by the client. These portions of the spatial event map together represent the workspace as a linear sequence of events from the beginning of workspace-time to the present. The "beginning of workspace-time" can be considered an elapsed time from the time of initiation of the collaboration session, or an absolute time recorded in association with the session.
5. The client assembles a cached copy of the spatial event map in its local memory.
6. The client displays an appropriate region of the workspace using its spatial event map to determine what is relevant given the current displayable area or viewport on the local display.

Connecting to the session channel of live spatial event map events:
1. After authorization, a client requests to join a workspace channel.
2. The server adds the client to the list of workspace participants to receive updates via the workspace channels.
3. The client receives live messages from the workspace that carry both history events and ephemeral events, and a communication paradigm like a chat room. For example, a sequence of ephemeral events, and a history event can be associated with moving object in the spatial event map to a new location in the spatial event map.
4. The client reacts to live messages from the server-side network node by altering its local copy of the spatial event map and re-rendering its local display.
5. Live messages consist of "history" events which are to be persisted as undue-double, recorded events in the spatial event map, and "ephemeral" events which are pieces of information that do not become part of the history of the session.
6. When a client creates, modifies, moves or deletes an object by interaction with its local display, a new event is created by the client-side network node and sent across the workspace channel to the server-side network node. The server-side network node saves history events in the spatial event map for the session and distributes both history events and ephemeral events to all active clients in the session.
7. When exiting the session, the client disconnects from the workspace channel.

Selection of One or More Network Nodes to Send Shared Workspace

The technology disclosed includes logic to map a phone number or other unique identifier of a user of the collaboration system to a plurality of display identification codes (DICs). The technology disclosed includes logic to register DICs in the plurality of DICs with respective network nodes. This mapping enables a user of the collaboration system to select one or more DICs to send the shared workspace to. The system then sends the shared workspace in the collaboration meeting to network nodes associated with selected DICs.

Figure 14:
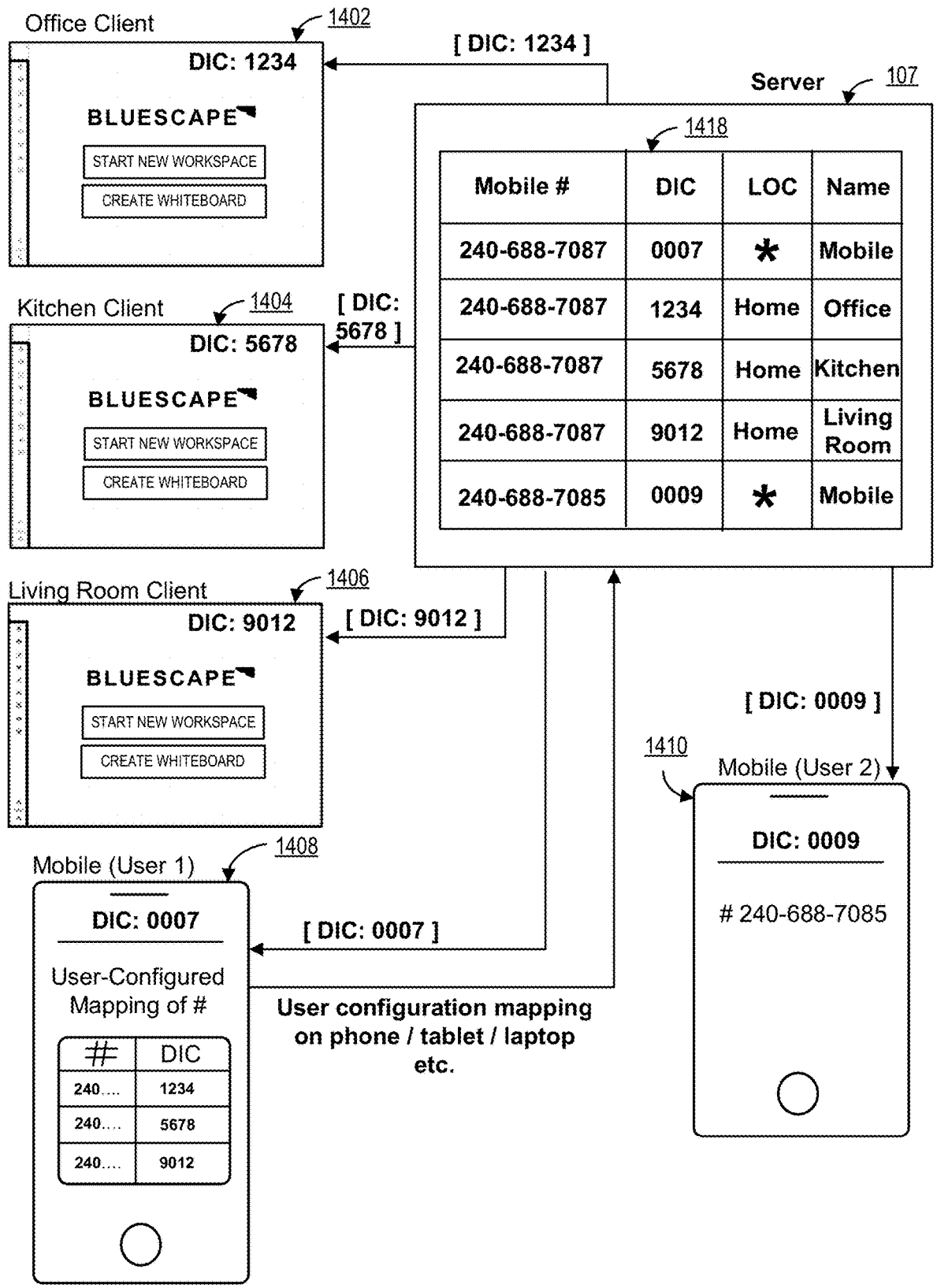
FIG. 14 illustrates a server network node connected to a plurality of client network nodes including mobile communication devices of respective users in a collaboration meeting.

FIG. 14 presents a high-level architecture of the collaboration system that includes a server 107 (also referred to as a server network node or a collaboration server) and a plurality of client-side nodes including large format displays and mobile devices. The server 107 can have access to a database that stores the shared workspace as well as mapping information identifying mappings between phone number or other unique identifiers of users, DICs, locations, names, etc. The mappings can be stored in a separate database or in the same database that stores information regarding the shared workspace. The server network node 107 can register the display identification codes (DICs) with respective network nodes.

For example, in FIG. 14, the server network node 107 registers a display identification code (DIC) "0007" with a network node 1408 of a first user, labeled as "Mobile" or "Mobile Device". The server network node 107 registers a DIC "1234" with a network node 1402 labeled as "Office Client". The server network node 107 registers a DIC "5678" with a network node 1404 labeled as "Kitchen Client". The server network node 107 registers a DIC "9012" with a network node 1406 labeled as "Living Room Client". The server network node 107 registers a DIC "0009" with a network node 1410 of a second user, labelled as "Mobile" or "Mobile Device).

The system can include logic to register a phone number or other unique identifier such as an email address, a username, a phone number associated with an app such as WhatsApp™, etc. with the network nodes 1402, 1404, 1406, 1408, 1410. For example, the server network node 107 can include a table (or database) 1418, that maps phone number "240-688-7087" of a first user to the DICs "0007", "1234", "5678", and "9012" and the phone number "240-688-7085" of a second user to the DIC "0009". The mapping information in the table 1418 can also include location information for the respective network nodes. For example, in the table 1418, the network nodes registered with the DICs "1234", "5678", "9012" have a location "Home". The network nodes registered with DICs "0007", and "0009" have a location "*" which can indicate that these network nodes are mobile communication devices and have no fixed location. In another implementation, the system can detect a current location of a mobile communication device and update the location information of the mobile communication device in the table to reflect the current location. The system can use existing technologies to detect a location of a mobile communication device such as by accessing the current location provided by a GPS installed on the mobile communication device or by getting the location information from cellular service provider or from a Wi-Fi network or a Bluetooth connection to which the mobile communication device is connected etc.

The table 1418 that includes the mapping information of mobile phone numbers or other unique identifiers of a user to DICs can also include a name of the network node with which the DIC is registered. For example, the table 1418 includes a column (or field) that indicates a name "mobile" of the network node with the DIC "0007", a name "Office" of the network node with the DIC "1234", a name "Kitchen" of the network node with the DIC "5678", a name "Living Room" of the network node with the DIC "9012", and a name "Mobile" of the network node with the DIC "0009".

A user of the network node 1408 (or any other network node) can create the mappings between their various other network nodes 1402, 1404, 1046 and the phone numbers or other unique identifiers, DICs, locations and names. The user can be restricted to only create mappings for network nodes of which they are registered to use or for which they are classified as account owners or managers, so as to prevent non-registered users from changing mappings or from creating inappropriate mappings. As illustrated in FIG. 14, User 1 (e.g., a first user) of network device 1408 creates and sends mapping information to the server network node 107. The server network node 107, in the same manner as discussed above with reference to any of FIGS. 1-13, can assign the DICs to the network nodes 1042, 1404, 1406, 1408, 1410. User 2 (e.g., a second user) can also use their network node 1410 to create mappings associated with their network node or nodes.

Figure 15A:
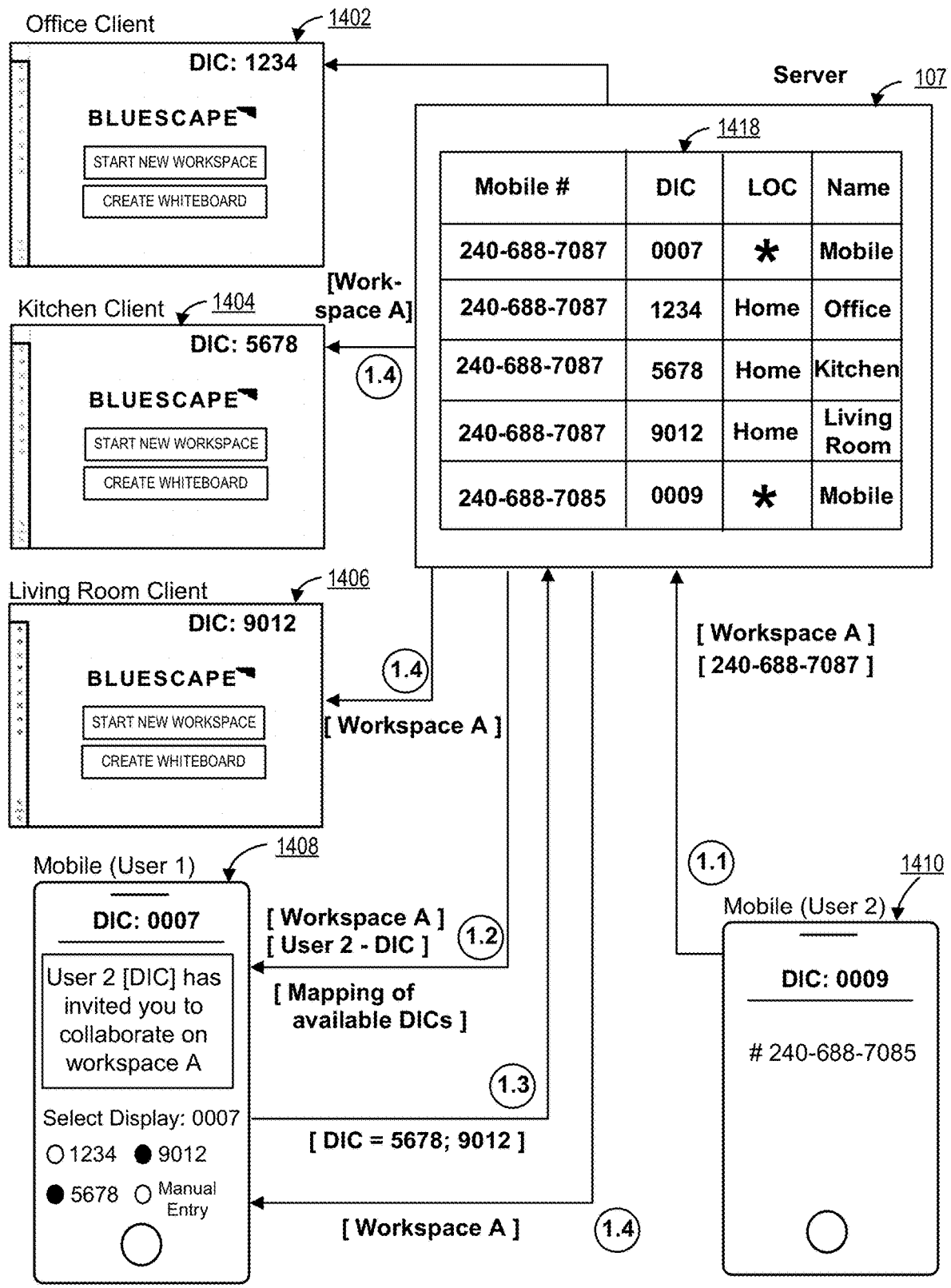
FIG. 15A illustrates an implementation of the technology disclosed in which a workspace is shared by a second user with a first user via the server network node.

FIG. 15A presents an implementation of the technology disclosed in which a user of the collaboration system shares a workspace with another user of the collaboration system via the server network node 107. FIG. 15A includes some of the same illustrations and references numbers as FIG. 14 and redundant descriptions thereof are omitted.

Further, FIG. 15A shows a sequence of messages or process steps between various network nodes 107, 1402, 1404, 1406, 1408, 1410 of the collaboration system labeled as 1.1, 1.2, 1.3, and 1.4 to illustrate sharing of the workspace by a second user with a first user. The server 107 detects an input (via the message "1.1") from the mobile device 1410 of the second user. The input identifies a shared digital workspace A (also referred to as "workspace A") and the registered phone number of the first user. Alternatively, the input can include other types of identifiers of the first user such as an email address, a username, etc. The system includes logic to determine that one or more matches exist when the registered phone number or other unique identifier of the first user is received by the server 107 from the mobile device 1410 of the second user. The system can access mapping in the table 1418 to determine that the registered phone number received in the message "1.1" is mapped to a plurality of DICs i.e., DIC "0007", DIC "1234", DIC "5678", and DIC "9012".

The server 107 can transmit, via the message "1.2", the identification of the shared digital workspace and the identification of each of the DICs mapped to the phone number or other unique identifier of the first user to a main communication node (e.g., mobile device 1408) of the first user. The table 1418 or another database can store an indication that a particular network node of the first user is a main communication node of the first user. For example, in one implementation, the table 1418 can include an additional column containing a label that indicates the DIC of the user mapped to a main communication node of a user. In the examples presented in FIGS. 14, 15A and 15B the mobile communication devices of the first and second users are presented as the main communication nodes. The system can store this information in the table 1418 or in another table in the database.

FIG. 15A shows a message displayed on the mobile communication device 1408 of the first user that the second user has invited the first user to collaborate on workspace A. The message can also include the DIC of the main communication device 1410 of the second user or DIC of the network node from where the second user has initiated the sharing of the workspace A with the first user.

The system includes logic to display a user-configured mapping of the registered phone number or other unique identifier of the first user to the DICs on the main communication device 1408 of the first user. For example, in FIG. 15A, the user interface of the mobile device 1408 of the first user, displays the DICs of the first user mapped to the registered phone number of the first user. The system provides user interface elements such as checkboxes, radio buttons etc. for respective DICs displayed on the user interface of the mobile device 1408. FIG. 15A shows that the user interface on the mobile device 1408 displays radio buttons for DICs 1234, 9012, 5678 that are mapped to the registered phone number of the first user and stored in the table 1418. The DIC of the main communication node 1408 of the first user i.e., "0007" can be, by default, selected and therefore no selection user interface element is displayed for DIC "0007". The system can also provide an option to the first user to manually enter a display identification code (DIC), or any other registered identifier, as shown by the "manual entry" selection option in the user interface of the mobile communication device 1408. The first user can select one or more of the DICs by interacting with the user interface elements of respective DICs on the user interface of the mobile device 1408. FIG. 15A shows that the first user selects two DICs "9012" and "5678" for sending the data of the shared workspace A.

The server 107 receives, via the message "1.3," the selection of the one or more DICs from the main communication node of the user which in this example is the mobile device 1408. The server 107 starts a collaboration by sending data of the shared digital workspace to each of the network nodes registered with the DICs that are selected by the first user. The server 107 sends the data of the shared workspace A to the network node 1404 that is registered with the DIC "5678" and to the network node 1406 that is registered with the DIC "9012". The message "1.4" from the server 107 to the two network nodes includes the data of the shared workspace A. As illustrated, the data of the shared workspace A is not sent, at this time, to network node 1402 because the first user did not select DIC "1234". This allows the first user to determine which of their network nodes should be displaying and/or interacting with workspace A. during collaboration using workspace A the first user can have the ability to change their initial selection of network nodes. For example, if the first user moves away from their Kitchen and Living Room and into their Office, the first user can, using their main communication device 1408 (or other device) change which network nodes are "selected" for viewing and interaction with the shared workspace. Additionally, the system can determine the location of the main communication device 1408, such that, if the first user moves the main communication device 1408 away from the Kitchen and Living Room and into a predetermined proximity of the Office, then the Office client 1402 will be "selected" so that the workspace will be provided to the office client 1402 from the server 107 and optionally the shared workspace will be no longer send to the Kitchen client 1404 and the Living Room client 1406.

The system includes the logic that enables a user to configure the mapping of the registered phone number or other unique identifier of the user to the DICs. The user-configured mapping of the registered phone number or other unique identifier can include user defined names associated with each of the DICs. This information can be useful when requesting the user to select one or more DICs registered with network nodes. The user can select one or more DICs by selecting respective user defined names associated with the DICs. The server 107 can update the mapping information in the table 1418 to include the user-configured mapping of the registered phone number or other unique identifier of the DICs. The system includes logic to allow the users to select the DICs based on one or more of the user defined names associated with DICs. For example, the system can provide the user-defined names along with their respective DICs on the user interface of the mobile device 1408 of the first user for selection of DICs by the first user. The system can also provide the user-defined names without the DICs on the user interface of the mobile device 1408 for selection by the first user.

The mapping information of the table 1418 can identify respective location of the network nodes. For example, in FIG. 15A, the table 1418 includes a location column (or field) labeled as "LOC" that identifies a location of the network node registered with the corresponding DIC. The network nodes registered with DICs "1234", "5678", and "9012" are located at "home" location. The server 107 can include a logic to transmit the identification of the shared digital workspace and a DIC to a user when the location of the network node registered with the DIC matches the location of the user. For example, when the user location determination logic included in the server 107 determines that the user is located at "home", then the server 107 selects the network nodes registered with DICs that are located at "home". Note that the server 107 matches the DICs that are mapped to the registered phone number or other unique identifier of the user. If there are multiple DICs that match the location of the user then the server 107 can transmit all of the matching DICs to the user along with the identification of the shared digital workspace.

The server network node 107 can include logic to match a DIC registered with the second user who initiates sharing of the workspace with the first user. The server network node can include logic to register a phone number or other unique identifier of the second user with a network node. The mapping information maps the registered phone number or other unique identifier of the second user with the DIC. For example, in FIG. 15A, the server 107 has registered a phone number "240-688-7085" of the second user with a network node 1410 which is a mobile communication device of the second user. The table 1418 maps the registered phone number of the second user to a DIC "0009". The server 107 can include logic to match the registered phone number or other unique identifier of the second user with the DIC. If the registered phone number of the second user matches a DIC in the table 1418 then server initiates transmitting of the identification of the shared digital workspace and the identification of the DICs to the main communication node of the first user.

Figure 15B:
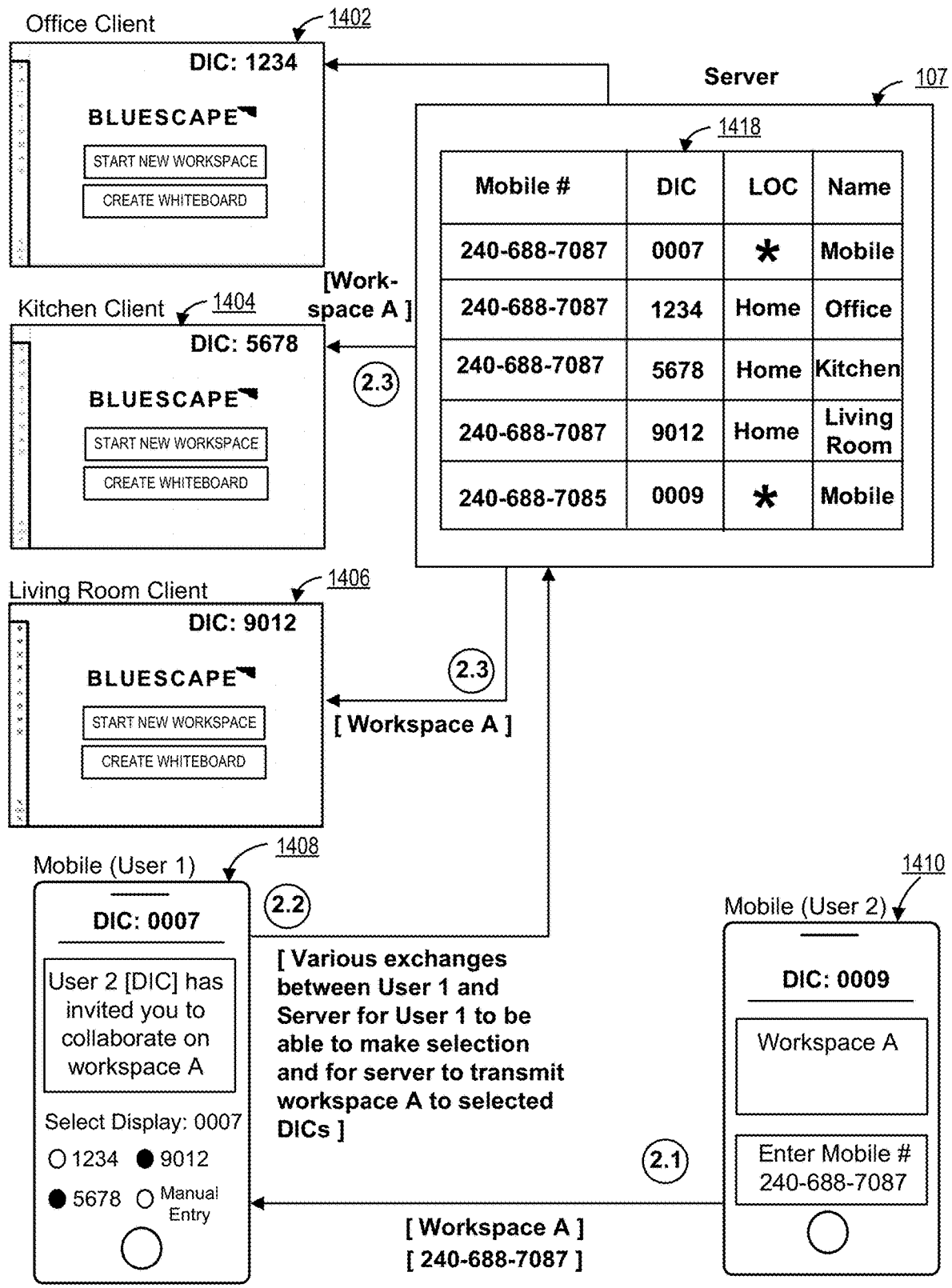
FIG. 15B illustrates another implementation of the technology disclosed in which a workspace is shared by a second user with a first user by communicating with a main communication node of the first user.

FIG. 15B presents another implementation of the technology disclosed in which the second user of the collaboration system can directly communicate with a main communication device of the first user to share a workspace. FIG. 15B includes some of the same illustrations and references numbers as FIGS. 14 and 15A and redundant descriptions thereof are omitted.

In this implementation, the second user can initiate a collaboration with the first user by sending an identification of the shared digital workspace A and a registered phone number or other unique identifier of the first user to the mobile communication device 1408 of the first user in a message "2.1" (or step "2.1"). Message "2.1" bypasses the server 107. The first user can then communicate with the server 107 in step "2.2" for selection of DICs registered with network nodes to which the first user intends to send the shared workspace A. Step "2.2" can include multiple messages between the mobile communication device 1408 of the first user and the server 107 for the selection of one or more DICs registered with network nodes. Once the first user has selected the DICs to which the user intends to send the shared workspace A, the server 107 transmits the shared digital workspace A to the network nodes 1404, 1406 mapped to the selected DICs in the table 1418. For example, as shown in FIG. 15B, the first user has selected DICs "5678", "9012". The server 107 sends the shared digital workspace A to the network nodes 1404 (corresponding to DIC "5678") and 1406 (corresponding to DIC "9012") via a message "2.3".

A collaboration system can have many, distributed digital displays which are used both to display images based on workspace data managed by a shared collaboration server, and to accept user input that can contribute to the workspace data, while enabling each display to rapidly construct an image to display based on session history, real time local input and real-time input from other displays.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

Also as used herein, a given signal, event or value is "responsive" to a predecessor signal, event, or value if the predecessor signal, event, or value influenced the given signal, event, or value. If there is an intervening processing element, step or time period, the given signal, event, or value can still be "responsive" to the predecessor signal, event, or value. If the intervening processing element or step combines more than one signal, event or value, the signal output of the processing element or step is considered "responsive" to each of the signal, event, or value inputs. If the given signal, event, or value is the same as the predecessor signal, event, or value, this is merely a degenerate case in which the given signal, event or value is still considered to be "responsive" to the predecessor signal, event, or value. "Dependency" of a given signal, event or value upon another signal, event or value is defined similarly.

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description, it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, though the displays described herein are of large format, small format displays can also be arranged to use multiple drawing regions, though multiple drawing regions are more useful for displays that are at least as large as 12 feet in width. In particular, and without limitation, any and all variations described, suggested by the Background section of this patent application or by the material incorporated by reference are specifically incorporated by reference into the description herein of embodiments of the invention. In addition, any and all variations described, suggested, or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method implemented by a server node, the method comprising:
    storing a database including mapping information mapping a registered phone number or other unique identifier of a first user to (i) a first display identification code (DIC) registered with a first node and (ii) a second DIC registered with a second node;
    receiving information from a second user identifying (i) a shared digital workspace and (ii) the registered phone number or other unique identifier of the first user;
    transmitting, to the second node of the first user, an identification of the shared digital workspace and an identification of each of the first DIC and the second DIC that is mapped to the registered phone number or other unique identifier in the mapping information; and
    in dependence upon receiving information identifying a selection of one or more of the first DIC and the second DIC from the second node, sending data of the shared digital workspace to each of the first node and the second node that is registered with the selected one or more of the first DIC and the second DIC.

2. The method of claim 1, further comprising, registering (i) the first DIC with the first node and (ii) the second DIC with the second node of the first user.

3. The method of claim 1, further comprising, registering the phone number or other unique identifier of the first user with the first node and the second node.

4. The method of claim 1, further comprising:
    receiving, from the second node of the first user, a user-configured mapping of the registered phone number or other unique identifier of the first user to the first and second DICs; and
    updating the mapping information in the database to include the user-configured mapping of the registered phone number or other unique identifier of the first user to the first and second DICs.

5. The method of claim 4, wherein the user-configured mapping of the registered phone number or other unique identifier includes user defined names associated with each of the first and second DICs.

6. The method of claim 5, wherein the received information identifying the selection of one or more of the first DIC and the second DIC identifies a selection of one or more of the user defined names associated with each of the first and second DICs.

7. The method of claim 1, further comprising:
    determining that one or more matches exist when the registered phone number or other unique identifier of the first user, as included in the received information from the second user, is mapped to one or more of the first and second DICs in the mapping information,
    wherein the identification of the first DIC is only transmitted to the first node upon a determination that a match exists between the registered phone number or other unique identifier and the first DIC, and
    wherein the identification of the second DIC is only transmitted to the second node upon a determination that a match exists between the registered phone number or other unique identifier and the second DIC.

8. The method of claim 1,
    wherein the database includes an indication that the second node of the first user is a main communication node of the first user, and
    wherein the identification of the shared digital workspace and the identification of each of the first DIC and the second DIC is transmitted to the second node in dependence upon the second node being identified, in the database, as the main communication node of the first user.

9. The method of claim 8, wherein the second node is a mobile communication device.

10. The method of claim 1,
    wherein the mapping information of the database identifies a location of the first node registered with the first DIC, and
    wherein the server node comprises further logic to (i) determine a location of the first user and (ii) transmit, to the second node of the first user, an identification of the shared digital workspace and an identification of (i) the first DIC, only when the location of the first node registered with the first DIC sufficiently matches the location of the first user.

11. The method of claim 1, further comprising:
    registering a third DIC with a third node of the second user; and
    registering a phone number or other unique identifier of the second user with the third node, wherein the mapping information maps the registered phone number or other unique identifier of the second user to the third DIC,
    wherein, prior to the transmitting of the identification of the shared digital workspace and the identification of each of the first DIC and the second DIC to the second node of the first user, the phone number or other unique identifier of the second user, as received from the second user, is matched with the third DIC.

12. The method of claim 1, wherein the mapping information includes user defined names associated with each of the first and second DICs.

13. A server node, comprising:
    a processor and a database accessible thereto, the database storing a shared digital workspace, the server node comprising logic, executable by the processor, to perform operations comprising:
  storing in the database, a mapping information mapping a registered phone number or other unique identifier of a first user to (i) a first display identification code (DIC) registered with a first node and (ii) a second DIC registered with a second node;
  receiving information from a second user identifying (i) the shared digital workspace and (ii) the registered phone number or other unique identifier of the first user;
  transmitting, to the second node of the first user, an identification of the shared digital workspace and an identification of each of the first DIC and the second DIC that is mapped to the registered phone number or other unique identifier in the mapping information; and
  in dependence upon receiving information identifying a selection of one or more of the first DIC and the second DIC from the second node, sending data of the shared digital workspace to each of the first node and the second node that is registered with the selected one or more of the first DIC and the second DIC.

14. The server node of claim 13, further implementing operations comprising, registering (i) the first DIC with the first node and (ii) the second DIC with the second node of the first user.

15. The server node of claim 13, further implementing operations comprising, registering the phone number or other unique identifier of the first user with the first node and the second node.

16. The server node of claim 13, further implementing operations comprising:
  receiving, from the second node of the first user, a user-configured mapping of the registered phone number or other unique identifier of the first user to the first and second DICs; and
  updating the mapping information in the database to include the user-configured mapping of the registered phone number or other unique identifier of the first user to the first and second DICs.

17. The server node of claim 16, wherein the user-configured mapping of the registered phone number or other unique identifier includes user defined names associated with each of the first and second DICs.

18. A non-transitory computer-readable recording medium having computer instructions recorded thereon, the computer instructions, when executed on one or more processors, causing the one or more processors to perform operations comprising:
  storing in a database including mapping information mapping a registered phone number or other unique identifier of a first user to (i) a first display identification code (DIC) registered with a first node and (ii) a second DIC registered with a second node;
  receiving information from a second user identifying (i) a shared digital workspace and (ii) the registered phone number or other unique identifier of the first user;
  transmitting, to the second node of the first user, an identification of the shared digital workspace and an identification of each of the first DIC and the second DIC that is mapped to the registered phone number or other unique identifier in the mapping information; and
  in dependence upon receiving information identifying a selection of one or more of the first DIC and the second DIC from the second node, sending data of the shared digital workspace to each of the first node and the second node that is registered with the selected one or more of the first DIC and the second DIC.

19. A method comprising:
  generating, by a first node of a first user, a user-configured mapping of a registered phone number or other unique identifier of the first user to (i) a first display identification code (DIC) associated with the first node and (ii) a second DIC associated with a second node;
  transmitting, by the first node and to a server node, the generated user-configured mapping; and
  transmitting, by a third node of a second user and to the server node, an information from the second user identifying (i) a shared digital workspace and (ii) the registered phone number or other unique identifier of the first user,
  wherein the method further includes the first node:
    receiving an identification of the shared digital workspace and an identification of each of the first DIC and the second DIC that is mapped to the registered phone number or other unique identifier in mapping information;
    receiving an information identifying a selection, from a user interface of the first node, of one or more of the first DIC and the second DIC;
    transmitting the information identifying the selection of one or more of the first DIC and the second DIC to the server node; and
    receiving, from the server node, data of the shared digital workspace at the (i) the third node and (ii) each of the first node and the second node that is registered with the selected one or more of the first DIC and the second DIC.

20. A method implemented by a server node, the method comprising:
  storing a database including mapping information mapping a registered phone number or other unique identifier of a first user to (i) a first display identification code (DIC) registered with a first node and (ii) a second DIC registered with a second node;
  receiving information from the first user identifying (i) a shared digital workspace and (ii) the registered phone number or other unique identifier of the first user;
  transmitting, to the second node of the first user, an identification of the shared digital workspace and an identification of each of the first DIC and the second DIC that is mapped to the registered phone number or other unique identifier in the mapping information; and
  in dependence upon receiving information identifying a selection of one or more of the first DIC and the second DIC from the second node, by sending data of the shared digital workspace to each of the first node and the second node that is registered with the selected one or more of the first DIC and the second DIC.

* * * * *